(12) United States Patent
Guan et al.

(10) Patent No.: US 11,438,888 B2
(45) Date of Patent: *Sep. 6, 2022

(54) BEAM CONFIGURATION METHOD AND APPARATUS

(71) Applicant: HUAWEI TECHNOLOGIES CO., LTD., Guangdong (CN)

(72) Inventors: Peng Guan, Shenzhen (CN); Yi Qin, Kista (SE); Jianqin Liu, Beijing (CN); Peng Jiang, Shenzhen (CN); Di Zhang, Beijing (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/336,948

(22) Filed: Jun. 2, 2021

(65) Prior Publication Data

US 2021/0289485 A1 Sep. 16, 2021

Related U.S. Application Data

(63) Continuation of application No. 16/674,845, filed on Nov. 5, 2019, now Pat. No. 11,089,590, which is a (Continued)

(30) Foreign Application Priority Data

Nov. 17, 2017 (CN) .......................... 201711164925.X
Nov. 2, 2018 (CN) .......................... 201811302964.6

(51) Int. Cl.
*H04W 72/04* (2009.01)

(52) U.S. Cl.
CPC ....... *H04W 72/044* (2013.01); *H04W 72/042* (2013.01)

(58) Field of Classification Search
CPC .. H04B 7/0617; H04B 7/0417; H04B 7/0626; H04B 7/0404; H04B 17/309;
(Continued)

(56) References Cited

U.S. PATENT DOCUMENTS 10,349,318 B2 * 7/2019 Kim ..................... H04W 8/22
10,568,136 B2 2/2020 Chou
(Continued)

FOREIGN PATENT DOCUMENTS

CN 104796185 7/2015
CN 106341882 1/2017
(Continued)

OTHER PUBLICATIONS

Office Action issued in Japanese Application No. 2019-556797 dated Aug. 24, 2021, 3 pages (with English translation).
(Continued)

*Primary Examiner* — Rahel Guarino
(74) *Attorney, Agent, or Firm* — Fish & Richardson P.C.

(57) ABSTRACT

The present disclosure relates to beam configuration methods and apparatus. One example method include receiving beam configuration information from a network device, where the beam configuration information indicates a terminal device to transmit or receive a signal by using a first beam, and transmitting or receiving the signal by using at least the first beam after a first preset duration starting from a first time-domain unit, where the first time-domain unit is an uplink slot in which an acknowledgement (ACK) message for the beam configuration information is transmitted to the network device.

38 Claims, 21 Drawing Sheets

Related U.S. Application Data continuation of application No. PCT/CN2018/115244, filed on Nov. 13, 2018.

(58) Field of Classification Search
CPC . H04W 72/042; H04W 72/046; H04W 36/30; H04W 72/0413; H04W 72/0453; H04W 72/082; H04W 72/04; H04W 74/002; H04W 72/0446; H04W 16/02; H04W 72/048; H04W 74/00; H04W 76/38; H04L 5/0055; Y02D 70/1262

See application file for complete search history.

(56) References Cited

U.S. PATENT DOCUMENTS

| | | | | |
|---|---|---|---|---|
| 11,089,590 | B2* | 8/2021 | Guan | H04L 5/0023 |
| 2016/0338033 | A1 | 11/2016 | Xiao et al. | |
| 2020/0288479 | A1* | 9/2020 | Xi | H04L 5/0053 |
| 2020/0389883 | A1* | 12/2020 | Faxer | H04L 5/0048 |

FOREIGN PATENT DOCUMENTS

| | | |
|---|---|---|
| CN | 106922033 A | 7/2017 |
| KR | 20160007269 | 1/2016 |
| KR | 20180030337 | 3/2018 |

OTHER PUBLICATIONS

3GPP TS 36.211 V13.0.0 (Dec. 2015), "3rd Generation Partnership Project; Technical Specification Group Radio Access Network; Evolved Universal Terrestrial Radio Access (E-UTRA); Physical channels and modulation (Release 13)," Dec. 2015, 142 pages.

3GPP TS 36.212 V13.0.0 (Dec. 2015), "3rd Generation Partnership Project;Technical Specification Group Radio Access Network; Evolved Universal Terrestrial Radio Access (E-UTRA); Multiplexing and channel coding (Release 13)," Dec. 2015, 121 pages.

3GPP TS 36.213 V13.0.0 (Dec. 2015), "3rd Generation Partnership Project; Technical Specification Group Radio Access Network; Evolved Universal Terrestrial Radio Access (E-UTRA); Physical layer procedures (Release 13)," Dec. 2015, 326 pages.

3GPP TS 36.331 V13.0.0 (Dec. 2015), 3rd Generation Partnership Project;Technical Specification Group Radio Access Network; Evolved Universal Terrestrial Radio Access (E-UTRA); Radio Resource Control (RRC); Protocol specification (Release 13), Dec. 2015, 507 pages.

3GPP TS 38.211 V1.0.0 (Sep. 2017), "3rd Generation Partnership Project;Technical Specification Group Radio Access Network;NR;Physical channels and modulation(Release 15)," Sep. 2017, 37 pages.

3GPP TS 38.213 V1.0.0 (Sep. 2017), "3rd Generation Partnership Project; Technical Specification Group Radio Access Network; NR; Physical layer procedures for control (Release 15)," Sep. 2017, 16 pages.

3GPP TS 38.214 V1.0.0 (Sep. 2017), "3rd Generation Partnership Project;Technical Specification Group Radio Access Network; NR; Physical layer procedures for data (Release 15)," Sep. 2017, 32 pages.

3GPP TS 38.321 V1.1.0 (Nov. 2017), 3rd Generation Partnership Project;Technical Specification Group Radio Access Network;NR;Medium Access Control (MAC) protocol specification(Release 15), Nov. 2017, 64 pages.

3GPP TS 38.331 V0.1.0 (Oct. 2017), "3rd Generation Partnership Project; Technical Specification Group Radio Access Network; NR; Radio Resource Control (RRC); Protocol specification (Release 15)," Oct. 2017, 42 pages.

Ericsson, "Analysis of beam indication signallIng options," 3GPP TSG RAN WG1 Meeting 90bis, R1-1718743; Prague, CZ, XP051353231, Oct. 9-13, 2017, 14 pages.

Ericsson,"Analysis of beam indication signalling options," 3GPP TSG-RAN WG1 #89ah-NR, R1-1711023; Qingdao, China, Jun. 27-30, 2017, 9 pages.

Extended European Search Report issued in European Application No. 18877610.8 dated May 6, 2020, 12 pages.

Nokia et al., "Summary of QCL," 3GPP TSG-RAN WG1 Meeting #90bis, R1-1718863; Prague, Czech Republic, Oct. 9-13, 2017, 21 pages.

Office Action issued in Korean Application No. 2019-7033514 dated May 21, 2021, 4 pages (with English translated).

PCT International Search Report and Written Opinion issued in International Application No. PCT/CN2018/115244 dated Feb. 11, 2019, 16 pages (with English translation).

Qualcomm Incorporated, "Control channel multi-beam operation," 3GPP TSG RAN WG1 #90, R1-1713420, Prague, Czech Republic, XP051316222, Aug. 21-25, 2017, 6 pages.

Qualcomm Incorporated, "Discussion on QCL," 3GPP TSG RAN WG1 Meeting 90bis, R1-1718551; Prague, Czech, XP051341732, Oct. 9-13, 2017, 10 pages.

Qualcomm, "Beam management for NR," 3GPP TSG-RAN WG1 #90bis, R1-1718541; Prague, P.R. Czechia, Oct. 9-13, 2017, 17 pages.

VIVO, "Discussion on beam measurement, beam reporting and beam indication," 3GPP TSG RAN WG1 Meeting #90bis, R1-1717472; Prague, CZ, XP051340660, Oct. 9-13, 2017, 12 pages.

CATT, "SS Burst Set Composition and SS Block Configuration," 3GPP TSG RAN WG1 NR Ad Hoc#2, R1-1710023, Qingdao, China, Jun. 27-30, 2017, 5 pages.

Office Action issued in Chinese Application No. 201811302964.6 dated May 18, 2022, 10 pages.

* cited by examiner

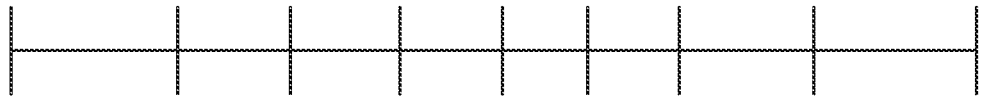

| Activated/ Deactivated (A/D) | Sounding reference signal resource set ID (SRS Resource Set ID) | | | | Sounding reference signal resource set bandwidth part ID (SRS Resource Set BWP ID) | Oct 1 (octet) |
|---|---|---|---|---|---|---|
| Reserved value (R) | R | C | SUL | Semi-persistent sounding reference signal resource set ID (SP SRS Resource Set ID) | | Oct 2 (octet) |
| $F_0$ | Resource $ID_0$ (Resource $ID_0$) | | | | | Oct 3 (octet) |

...

| $F_{M-1}$ | Resource $ID_{M-1}$ (Resource $ID_{M-1}$) | | Oct N–M (octet) |
|---|---|---|---|
| R | Resource serving cell $ID_0$ (Resource Serving Cell $ID_0$) | Resource bandwidth part $ID_0$ (Resource BWP $ID_0$) | Oct N–M+1 (octet) |

...

| R | Resource serving cell $ID_{M-1}$ (Resource Serving Cell $ID_{M-1}$) | Resource bandwidth part $ID_{M-1}$ (Resource BWP $ID_{M-1}$) | Oct N (octet) |
|---|---|---|---|

FIG. 26

BEAM CONFIGURATION METHOD AND APPARATUS

CROSS-REFERENCE TO RELATED APPLICATIONS

This application is a continuation of U.S. patent application Ser. No. 16/674,845, filed on Nov. 5, 2019, which is a continuation of International Application No. PCT/CN2018/115244, filed on Nov. 13, 2018. The International Application claims priority to Chinese Patent Application No. 201711164925.X, filed on Nov. 17, 2017 and Chinese Patent Application No. 201811302964.6, filed on Nov. 2, 2018. All of the afore-mentioned patent applications are hereby incorporated by reference in their entireties.

TECHNICAL FIELD

This application relates to the field of communications technologies, and in particular, to a beam configuration method and an apparatus.

BACKGROUND

With development of mobile services, increasingly high requirements are imposed on a data rate and efficiency of wireless communication. In 5G and future wireless communications systems, a beamforming technology is used to restrict signal transmission energy to a beam direction, to improve signal communication efficiency. The beamforming technology can effectively enlarge a transmission range of a radio signal and reduce signal interference, to achieve higher communication efficiency and obtain a larger network capacity.

In a communications network using the beamforming technology, beam alignment needs to be performed so that a signal received by a receive-end device by using a particular receive beam is from a particular transmit beam of a transmit-end device, thereby obtaining relatively good signal quality. Otherwise, relatively high communication efficiency cannot be achieved and even communication cannot be performed. With change of a communication channel environment, movement of a communications device (including a transmit-end device or a receive-end device), and the like, a beam (including a transmit beam or a receive beam) with relatively good channel quality may change. In this case, beam configuration is required.

SUMMARY

Embodiments of this application provide a beam configuration method and an apparatus, so that w % ben a terminal transmits a signal by using a first beam configured by a network device, the network device transmits the signal by using a second beam corresponding to the first beam, for example, the first beam and the second beam belong to a same beam pair, thereby improving signal transmission efficiency.

According to a first aspect, this application provides a beam configuration method. The method includes: receiving, by a terminal, beam configuration information sent by a network device, where the beam configuration information is used to instruct the terminal to transmit a signal by using a first beam, and transmitting, by the terminal, the signal by using at least the first beam when first preset duration starting from a first time point expires, where the first time point is a time point at which the terminal sends an ACK message for the beam configuration information to the network device. The first preset duration may be greater than or equal to 0. The beam configuration information may be beam configuration information in a beam configuration procedure performed for the first time, or may be beam configuration information in the beam configuration procedure performed again. If the transmitting the signal by using at least the first beam is specifically transmitting the signal by using only the first beam, the technical solution may be applied to a scenario in which the terminal supports single-beam transmission. If the transmitting the signal by using at least the first beam is specifically transmitting the signal by using another beam in addition to the first beam, the technical solution may be applied to a scenario in which the terminal supports single-beam transmission or multi-beam transmission. The technical solution may be applied to a downlink beam configuration scenario, or may be applied to an uplink beam configuration scenario. In the technical solution, when sending the ACK message for the beam configuration information to the network device, the terminal starts a timer, and transmits the signal by using the first beam when a timing time of the timer reaches the preset duration. In this way, if starting a timer when receiving the ACK message, the network device transmits, when a timing time of the timer reaches the preset duration, the signal by using a second beam corresponding to the first beam. Therefore, when the terminal sends the ACK message and the network device receives the ACK message, behavior consistency between the network device and the terminal is facilitated, thereby improving signal transmission efficiency.

In a possible design, the transmitting, by the terminal, the signal by using at least the first beam when first preset duration starting from a first time point expires may include: starting, by the terminal, a timer at the first time point, and transmitting the signal by using at least the first beam when a timing time of the timer reaches the first preset duration. The possible design provides a solution of implementing, by using the timer, the transmitting the signal by using at least the first beam when preset duration starting from a first time point expires. Certainly, a specific implementation is not limited thereto. For example, a manner such as setting a time window may be used for implementation.

In a possible design, the method may further include: stopping, by the terminal, the timer if receiving the beam configuration information again when the timer does not reach the first preset duration, and starting the timer at a second time point, where the second time point is a time point at which the terminal sends an ACK message for the re-received beam configuration information to the network device. The possible design may be applied to a scenario in which the terminal sends the ACK message to the network device but the network device does not receive the ACK message. In the scenario, if the network device starts the timer when receiving the ACK message, when the timing time of the timer reaches the preset duration, the network device transmits the signal by using the second beam corresponding to the first beam, thereby facilitating behavior consistency between the network device and the terminal.

In a possible design, the transmitting, by the terminal, the signal by using at least the first beam when first preset duration starting from a first time point expires may include: transmitting, by the terminal when the first preset duration starting from the first time point expires, the signal by using a beam used last time or a beam used by default, in addition to the first beam. The possible design may be applied to a scenario in which the terminal supports multi-beam transmission.

In a possible design, the method may further include: subsequently receiving, by the terminal, a signal by using the first beam if receiving the signal on the first beam; or sending, by the terminal, the ACK message for the beam configuration information to the network device if receiving the signal on a beam other than the first beam after the timing time of the timer reaches the first preset duration, starting the timer when sending the ACK message, and transmitting, when the timing time of the timer reaches the first preset duration, a signal by using the beam used last time or the beam used by default, in addition to the first beam; or sending, by the terminal, an error indication to the network device if receiving the signal on a beam other than the first beam, where the error indication is used to instruct the network device to resend the beam configuration information. The possible design may be applied to a downlink beam configuration procedure in a scenario in which the terminal supports multi-beam transmission. This facilitates behavior consistency between the network device and the terminal, thereby improving signal transmission efficiency.

In a possible design, the method may further include: sending, by the terminal, a signal by using the first beam when second preset duration starting from a third time point expires, where the third time point is a time point at which the timing time of the timer reaches the preset duration. The possible design may be applied to an uplink beam configuration procedure in a scenario in which the terminal supports multi-beam transmission. This facilitates behavior consistency between the network device and the terminal, thereby improving signal transmission efficiency.

According to a second aspect, this application provides a beam configuration method. The method may include: sending, by a network device, beam configuration information to a terminal, where the beam configuration information is used to instruct the terminal to transmit a signal by using a first beam, and transmitting, by the network device when preset duration starting from a first time point expires, the signal by using a second beam corresponding to the first beam, where the first time point is a time point at which the network device receives an ACK message that is for the beam configuration information and that is sent by the terminal. The preset duration herein may be "first preset duration" in the first aspect.

In a possible design, the transmitting, by the network device when preset duration starting from a first time point expires, the signal by using a second beam corresponding to the first beam may include: starting, by the network device, a timer at the first time point, and transmitting, when a timing time of the timer reaches the preset duration, the signal by using the second beam corresponding to the first beam.

In a possible design, the method may further include: receiving, by the network device, an error indication sent by the terminal, where the error indication is used to instruct the network device to resend the beam configuration information; and resending, by the network device, the beam configuration information to the terminal according to the error indication.

Any beam configuration method provided in the second aspect may be used in combination with a corresponding beam configuration method provided in the first aspect, to facilitate behavior consistency between the network device and the terminal, thereby improving signal transmission efficiency. For a correspondence between the technical solution provided in the first aspect and the technical solution provided in the second aspect and how to implement behavior consistency between the network device and the terminal, refer to the following specific embodiments.

According to a third aspect, this application provides a beam configuration method. The method may include: receiving, by a terminal, beam configuration information sent by a network device, where the beam configuration information is used to instruct the terminal to transmit a signal by using a first beam; sending, by the terminal, an ACK message for the beam configuration information to the network device; and receiving, by the terminal, indication information that is sent by the network device and that indicates that the ACK message is successfully transmitted, and transmitting the signal by using the first beam when preset duration starting from a fourth time point expires, where the fourth time point is a time point at which the terminal receives the indication information. The technical solution may be applied to a scenario in which the terminal supports single-beam transmission or multi-beam transmission. The technical solution may be applied to a downlink beam configuration scenario, or may be applied to an uplink beam configuration scenario. In the technical solution, three-way handshake is performed between the terminal and the network device. The terminal transmits the signal by using the first beam when the preset duration starting from the time point at which the terminal receives the indication information that is sent by the network device and that indicates that the ACK message for the beam configuration information is successfully transmitted expires. If the network device transmits, when the preset duration starting from a time point at which the indication information is sent expires, the signal by using a second beam corresponding to the first beam, behavior consistency between the network device and the terminal can be implemented, thereby improving signal transmission efficiency.

In a possible design, the transmitting, by the terminal, the signal by using the first beam when preset duration starting from a fourth time point expires may include: starting, by the terminal, a timer at the fourth time point, and transmitting the signal by using the first beam when a timing time of the timer reaches the preset duration.

According to a fourth aspect, this application provides a beam configuration method. The method may include: sending, by a network device, beam configuration information to a terminal, where the beam configuration information is used to instruct the terminal to transmit a signal by using a first beam; receiving, by the network device, an ACK message that is for the beam configuration information and that is sent by the terminal; and sending, by the network device to the terminal, indication information indicating that the ACK message is successfully transmitted, and transmitting, when preset duration starting from a fourth time point expires, the signal by using a second beam corresponding to the first beam, where the fourth time point is a time point at which the network device sends the indication information.

In a possible design, the transmitting, by the network device when preset duration starting from a fourth time point expires, the signal by using a second beam corresponding to the first beam may include: starting, by the network device, a timer at the fourth time point, and transmitting, when a timing time of the timer reaches the preset duration, the signal by using the second beam corresponding to the first beam.

Any beam configuration method provided in the fourth aspect may be used in combination with a corresponding beam configuration method provided in the third aspect, to facilitate behavior consistency between the network device and the terminal, thereby improving signal transmission efficiency. For details, refer to the following specific implementation parts.

According to a fifth aspect, this application provides a communications device. The communications device may be a terminal. In this case, the communications device may be configured to perform the beam configuration method according to the first aspect or the third aspect. The communications device may be a network device. In this case, the communications device may be configured to perform the beam configuration method according to the second aspect or the fourth aspect.

In a possible design, the communications device may be divided into function modules based on a corresponding method provided above. For example, function modules may be obtained through division based on functions. Alternatively, two or more functions may be integrated into one processing module.

In another possible design, the communications device may include a processor and a transceiver. Optionally, the communications device may further include a memory. The memory is configured to store a computer program, and when being executed by the processor, the computer program enables a corresponding method according to the first aspect to the fourth aspect to be performed. The transceiver is configured to communicate with another communications device under control of the processor. The memory may be a storage chip or the like.

This application further provides a computer-readable storage medium. The computer-readable storage medium stores a computer program, and when running on a computer, the computer program enables the computer to perform any possible method according to the first aspect to the fourth aspect.

This application further provides a computer program product, and when running on a computer, the computer program product enables any method according to the first aspect to the fourth aspect to be performed.

An embodiment of this application further provides a processing apparatus, to implement a function of the foregoing terminal or network device. The processing apparatus includes a processor and an interface, and the processing apparatus may be a chip. The processor may be implemented by hardware or software. When being implemented by hardware, the processor may be a logic circuit, an integrated circuit, or the like. When being implemented by software, the processor may be a general-purpose processor and is implemented by reading software code stored in a memory. The memory may be integrated into the processor, or may be independent of the processor.

It may be understood that any communications device, computer storage medium, or computer program product that is provided above is configured to perform a corresponding method provided above. Therefore, for beneficial effects that can be achieved by the communications device, computer storage medium, or computer program product, refer to beneficial effects in the corresponding method, and details are not described herein again.

BRIEF DESCRIPTION OF DRAWINGS

FIG. 26 is still yet another schematic signaling diagram of abeam configuration procedure according to an embodiment of this application.

DESCRIPTION OF EMBODIMENTS

The term "a plurality of" in this application means "two or more". The term "and/or" in this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between associated objects. The terms "first", "second", and the like in this application are intended to distinguish between different objects rather than limit a sequence of the different objects.

The technical solutions provided in this application may be applied to various communications systems. The technical solutions provided in this application may be applied to a 5G communications system, a future evolved system, a multi-communication converged system, or the like, or may be applied to an existing communications system or the like. The technical solutions provided in this application may be applied to a plurality of scenarios, for example, machine-to-machine (M2M), macro and micro communication, enhanced mobile broadband (eMBB), ultra-reliable and low latency communications (uRLLC), and massive machine type communications (mMTC). These scenarios may include but are not limited to a scenario of communication between terminals, a scenario of communication between network devices, a scenario of communication between a network device and a terminal, and the like. The following provides all descriptions by using an example in which the technical solutions are applied to the scenario of communication between a network device and a terminal.

Figure 1:
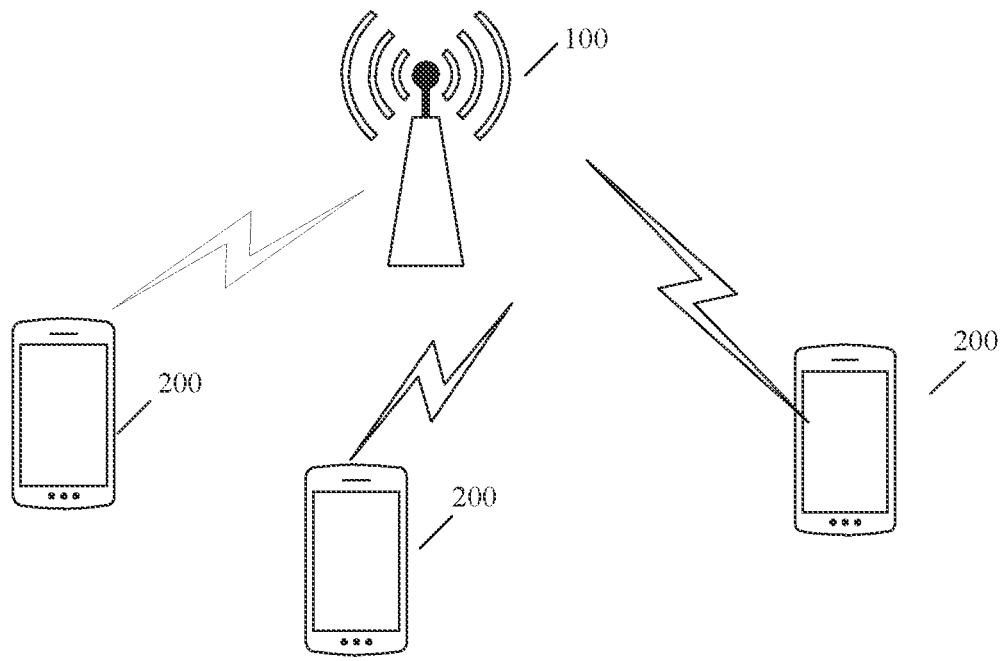
FIG. 1 is a schematic diagram of a system architecture to which technical solutions are applicable according to an embodiment of this application.

FIG. 1 is a schematic diagram of a communications system to which technical solutions are applicable according to this application. The communications system may include one or more network devices 100 (only one network device 100 is shown) and one or more terminals 200 connected to each network device. FIG. 1 is merely a schematic diagram, and constitutes no limitation on an applicable scenario of the technical solutions provided in this application.

The network device 100 may be a transmission reception point (TRP), a base station, a relay node, an access point, or the like. The network device 100 may be a network device in a 5G communications system or a network device in a future evolved network, or may be a wearable device, an in-vehicle device, or the like. In addition, the network device 100 may alternatively be a base transceiver station (BTS) in a Global System for Mobile Communications (GSM) or Code Division Multiple Access (CDMA) network, may be an NB (NodeB) in Wideband Code Division Multiple Access (WCDMA), or may be an eNB or an eNodeB (evolved NodeB) in Long Term Evolution (LTE). Alternatively, the network device 100 may be a radio controller in a cloud radio access network (CRAN) scenario.

The terminal 200 may be user equipment (UE), an access terminal, a UE unit, a UE station, a mobile station, a mobile console, a remote station, a remote terminal, a mobile device, a UE terminal, a wireless communications device, a UE agent, a UE apparatus, or the like. The access terminal may be a cellular phone, a cordless phone, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, a terminal device in a 5G network, a terminal in a future evolved PLMN, or the like.

A beam is a communication resource. Beams may be classified into a transmit beam and a receive beam. The transmit beam may be understood as signal strength distribution formed in different directions in space after a signal is sent by using an antenna. The receive beam may be understood as signal strength distribution of a radio signal in different directions in space that is received from an antenna. Different beams may be considered as different resources. Same information or different information may be sent by using different beams. One beam may include one or more antenna ports, configured to transmit data channel information, control channel information, a sounding signal, and the like. The beam may be, for example, a spatial filter in a protocol.

A beam pair is formed based on the concept of the beam. One beam pair usually includes one transmit beam of a transmit-end device and one receive beam of a receive-end device. In a downlink direction, the transmit-end device may be a network device, and the receive-end device may be a terminal. In an uplink direction, the transmit-end device may be a terminal, and the receive-end device may be a network device.

Beam indication information is used to indicate a beam. The beam indication information may be, for example, at least one piece of the following information, an index of the beam (for example, a relative number, a logical number, a physical number, or the like of the beam), a port number corresponding to a reference signal carried on the beam, beam pair link (BPL) information, or the like. It should be noted that the beam indication information may alternatively be implicitly indicated by using other information. For example, there is a correspondence between the beam indication information and the other information. Therefore, the beam may be indicated by indicating the other information. The other information may be, for example, quasi co-location (QCL) information of the beam. QCL is used to indicate that there is one or more same or similar communication features between a plurality of resources. Generally, different network devices have different channel large-scale information. Same or similar communication configurations may be used for a plurality of resources having a QCL relationship. For example, if there is a QCL relationship between two antenna ports, a channel large-scale characteristic of transmitting a symbol by one port may be deduced from a channel large-scale characteristic of transmitting a symbol by the other port. The large-scale characteristic may include delay spread, an average delay, Doppler spread, Doppler frequency shift, an average gain, a reception parameter, a terminal receive beam number, transmit/receive channel correlation, a reception angle of arrival, spatial correlation of a receiver antenna, a dominant angle of arrival (AoA), an average angle of arrival, AoA spread, and the like.

In a communications system, for example, a 5G new radio (NR) system, a network device and a terminal each can generate one or more beams. For example, before a signal is transmitted, a beam pair with relatively good channel quality may be preselected through beam alignment to transmit the signal. The signal may be, for example, data channel information, control channel information, a sounding signal, or the like.

In the communications system, the beam pair with relatively good channel quality may change in both a downlink direction and an uplink direction. The network device may interact with the terminal periodically or in a triggered manner, to measure channel quality of each beam pair, and perform a beam configuration procedure when configuring a beam for the terminal for the first time or determining that a beam used by the terminal for current communication needs to change. When determining that a beam in the downlink direction needs to be configured for the terminal, the network device performs a downlink beam configuration procedure, that is, a procedure in which the network device instructs the terminal to receive a signal by using a receive beam. The receive beam may be any receive beam of the terminal. When determining that a beam in the uplink direction needs to be configured for the terminal, the network device performs an uplink beam configuration procedure, that is, a procedure in which the network device instructs the terminal to send a signal by using a transmit beam. The transmit beam may be any transmit beam of the terminal.

In the downlink direction, if at a same time point, the network device sends a signal by using a transmit beam and the terminal receives the signal by using a receive beam corresponding to the transmit beam (for example, the transmit beam and the receive beam belong to a same beam pair), it is considered that behavior of the network device is consistent with that of the terminal. Otherwise, it is considered that behavior of the network device is inconsistent with that of the terminal. In the uplink direction, if at a same time point, the terminal sends a signal by using a transmit beam and the network device receives the signal by using a receive beam corresponding to the transmit beam (for example, the transmit beam and the receive beam belong to a same beam pair), it is considered that behavior of the network device is consistent with that of the terminal. Otherwise, it is considered that behavior of the network device is inconsistent with that of the terminal.

The beam configuration method provided in this application may be specifically, for example, performing beam configuration on a control channel or performing beam configuration on a data channel. The following provides all descriptions by using an example in which beam configuration is performed on the control channel.

The following briefly describes beam configuration information that is transmitted when beam configuration is performed on the control channel.

The beam configuration information is used to configure, for a terminal, a beam used to transmit a signal. Specifically, a transmission configuration index (TCI), specifically, a TC bit, may be indicated to the terminal to indicate related information of a beam. Possible beam configuration information sent by using RRC signaling or MAC signaling may be shown in the following Table 3. Before that, for better understanding, related information of the TCI may be first described.

The TCI may be used to indicate a related configuration for transmitting information, for example, may be used to indicate information about a receive beam used by the terminal. Each TCI bit corresponds to one TCI state configured by using higher layer signaling, as shown in Table 1.

TABLE 1

| TCI bit | TCI state |
|---------|-----------|
| 00      | TCI_00    |
| 01      | TCI_01    |

TABLE 1-continued

| TCI bit | TCI state |
|---------|-----------|
| 10      | TCI_02    |
| 11      | TCI_03    |

Each TCI state corresponds to configuration information of one reference signal set (RS set), as shown in Table 2.

TABLE 2

| TCI state | RS set state         |
|-----------|----------------------|
| TCI_00    | TCI-RS-SetConfig[0]  |
| TCI_01    | TCI-RS-SetConfig[1]  |
| TCI_02    | TCI-RS-SetConfig[2]  |
| TCI_03    | TCI-RS-SetConfig[3]  |
| ...       | ...                  |
| TCI_(M-1) | TCI-RS-SetConfig[M-1]|

Figure 3:
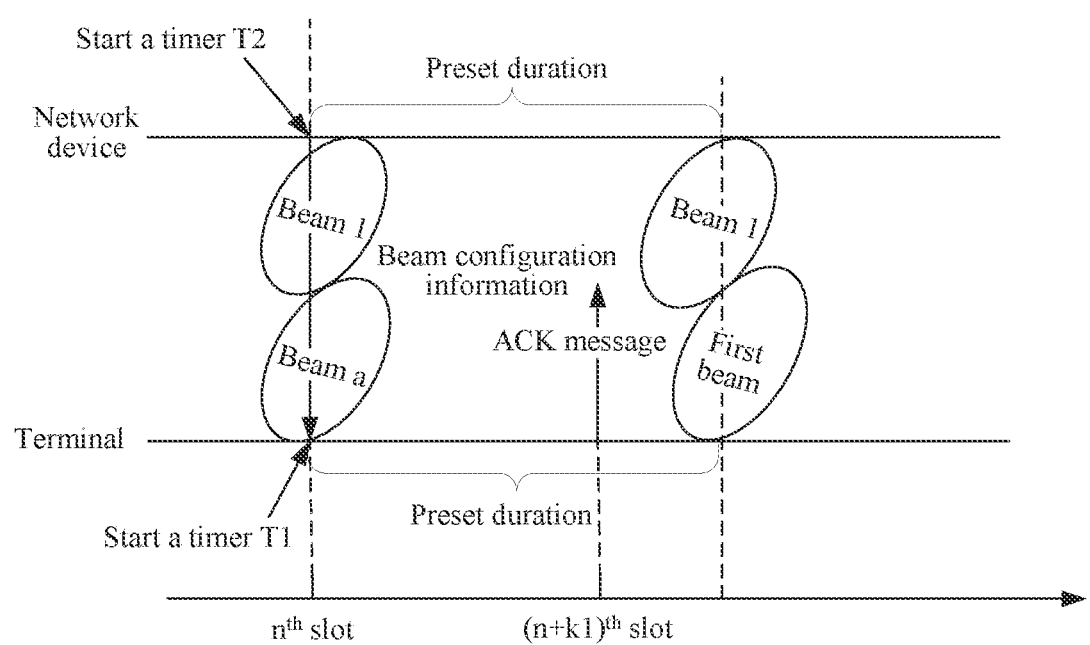
FIG. 3 is a second schematic diagram of a beam configuration method according to an embodiment of this application.

A configuration of each reference signal set (RS set) may be specifically used to describe a QCL relationship between one or more reference signals and a data channel reference signal, as shown in FIG. 3.

TABLE 3

| | TCI-RS-SetConfig[x] | | | |
|---|---|---|---|---|
| RS | QCL information | Time information | Frequency resource information | Other information |
| SSB number #a | Reception parameter | Time #1 | Carrier #1 | |
| CSI-RS number #A | Delay spread, average delay, Doppler spread, Doppler frequency shift, average gain, and reception parameter | Time #5 | Carrier #3 | |

TCI-RS-SetConfig[x] indicates a reference signal set configuration x. Table 3 indicates that there is a QCL relationship between an SS block numbered #a that is transmitted on the carrier #1 at the time #1 and the data channel reference signal in regard to the reception parameter, and there is a QCL relationship between a CSI-RS numbered #A that is transmitted on the carrier #3 at the time #5 and the data channel reference signal in regard to the delay spread, average delay, Doppler spread, Doppler frequency shift, average gain, and reception parameter. These pieces of information may be used to demodulate a data channel signal.

The SSB number may be an SS block index.

The CSI-RS number may be a channel state information-reference signal (CSI-RS) resource index, a CSI-RS resource set index, a CSI-RS port index, or the like, or may be a combination thereof.

The QCL information may be a specific parameter, or may be a QCL type. Different QCL types include different parameters.

The time information may be a slot number, a subframe number, an absolute time, a symbol number, a period number, or the like.

The frequency resource information may be a carrier number, a bandwidth part number, or the like.

The other information may include a measurement limitation or the like, that is, a measurement result of an RS at a frequency in a period of time cannot be used to facilitate data channel demodulation.

In addition, all the foregoing configurations of the TCI are transmitted by using RRC signaling and/or MAC signaling. A validation time of the foregoing various configurations may be determined by using a same method as a validation time of the beam configuration information in this application.

"Same time/same time point" described in this application means a same time interval (TI). The TI may be a transmission time interval (TTI) in an LTE system, a symbol-level short TTI, a short TTI of a large subcarrier spacing in a high-frequency system, a slot or a mini-slot in a 5G system, or the like. This is not limited in this application. The following provides all descriptions by using an example in which the TI is a slot.

In this application, for any information, for example, n1, n2, m1, or m2, that may be configured by using signaling, in a specific configuration process, the signaling may be but not limited to, for example, at least one of Radio Resource Control (RRC) signaling, Media Access Control (MAC) signaling, or downlink control information (DCI). Details are not described below again. In addition, any information that may be configured by using signaling may be carried in the beam configuration information or may be carried in other configuration information. The following provides descriptions by using an example in which any information that may be configured by using signaling is carried in the beam configuration information.

In a specific example in this application, an objective of "performing some steps when preset duration starting from a time point expires" is achieved by setting a timer. In a specific implementation, the objective may alternatively be achieved by setting a time window, a time offset, or the like.

Figure 2:
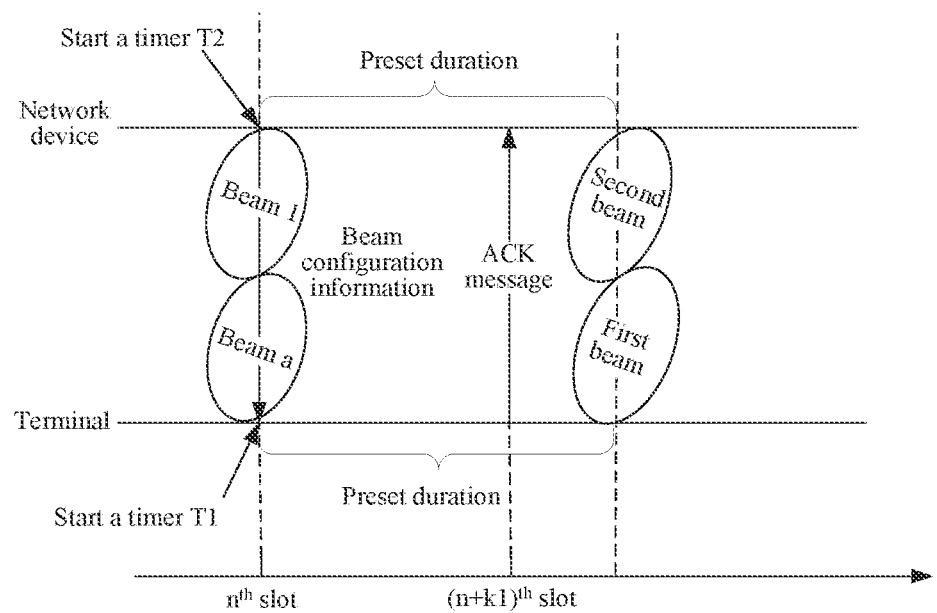
FIG. 2 is a first schematic diagram of a beam configuration method according to an embodiment of this application.

As shown in FIG. 2 and FIG. 3, a beam configuration method is provided. Specifically, the method may include the following steps.

A network device sends beam configuration information to a terminal and starts a timer T2 in an $n^{th}$ slot, where n is an integer greater than or equal to 0, and the beam configuration information is used to instruct the terminal to transmit a signal on a first beam.

The first beam may be a receive beam or a transmit beam. If the first beam is a receive beam, a beam configuration procedure provided in this embodiment is specifically a downlink beam configuration procedure, and the beam configuration information is specifically used to instruct the terminal to receive the signal on the first beam. If the first beam is a transmit beam, a beam configuration procedure provided in this embodiment is specifically an uplink beam configuration procedure, and the beam configuration information is specifically used to instruct the terminal to send the signal on the first beam.

Signaling carrying the beam configuration information may be, for example, at least one of RRC signaling, MAC signaling, or DCI.

The beam configuration information may carry beam indication information of the first beam. For related descriptions of the beam indication information, refer to the foregoing descriptions, and details are not described herein again.

The terminal receives the beam configuration information and starts a timer T1 in the $n^{th}$ slot.

The terminal checks the beam configuration information.

If the check succeeds, the terminal sends an acknowledgement (ACK) message to the network device in an $(n+k1)^{th}$ slot. The ACK message is used to indicate, to the network device, that the terminal has successfully received the beam configuration information. When a timing time of the timer T1 reaches preset duration, the terminal transmits the signal by using the first beam. Before the timing time of the timer T1 reaches the preset duration, the terminal transmits the signal by using a beam used last time or a default beam, as shown in FIG. 2.

If the check fails, the terminal sends a negative acknowledgement (NACK) message to the network device in an $(n+k1)^{th}$ slot. The NACK message is used to indicate, to the network device, that the terminal does not successfully receive the beam configuration information. In this case, the terminal transmits the signal by using a beam used last time or a default beam regardless of whether a timing time of the timer T1 reaches preset duration.

Herein, k1 is an integer greater than or equal to 1, and k1 may be a value configured by the network device for the terminal by using signaling or may be a preset value, for example, a value stipulated in a protocol. In this embodiment, the preset duration is usually greater than k1 slots. In the following embodiments, the preset duration and the k1 slots may not meet this relationship.

The preset duration may be configured by the network device for the terminal, for example, is carried in the beam configuration information or other configuration information to be sent to the terminal. Specifically, the preset duration may be determined by the network device based on capability information of the terminal that is fed back by the terminal. Same or different preset duration may be configured for different terminals. Certainly, the preset duration may be preset, for example, preset by using a protocol.

Transmitting the signal by using the first beam may be understood as that signal transmission on the first beam is validated, that is, if a signal needs to be transmitted between the network device and the terminal subsequently, the signal is transmitted by using the first beam. For example, in the downlink beam configuration procedure, the transmitting the signal by using the first beam may be understood as that signal reception that is on the first beam and that is configured in this beam configuration procedure is validated, that is, the terminal subsequently monitors the first beam to receive a signal sent by the network device.

A meaning of "transmitting a signal by using a second beam", "transmitting a signal by using each beam in a beam set", or the like in the following has a similar meaning to "transmitting the signal by using the first beam", and details are not described below again.

In the downlink beam configuration procedure, the beam used last time is a receive beam used by the terminal last time, and the default beam is a receive beam used by the terminal by default.

The receive beam used by the terminal by default may be a receive beam configured by the network device for the terminal by using higher layer signaling (for example, RRC signaling or MAC signaling), and may be, for example, any one of the following: a beam of a synchronization signal block (SSB) used by the terminal for initial access, a receive beam corresponding to a first state of a TCI, a receive beam used last time, an omnidirectional receive beam, or the like.

Optionally, the terminal may use different beams by default in different scenarios. Several optional manners are listed below:

The beam used for initial access is used when a TCI table is not configured by using the higher layer signaling (for example, the RRC signaling).

The beam corresponding to the first state of the TC is used when a TCI table is configured by using the higher layer signaling but there is no explicit TCI indication.

The beam that is used last time, a wide beam, or a pre-defined fallback beam is used when a TCI table is configured by using the higher layer signaling and there is an explicit TCI indication, but a TC validation time (that is, the preset duration in this application) is less than a predetermined threshold (the threshold may be determined based on a capability of the terminal).

In the uplink beam configuration procedure, the beam used last time is a transmit beam used by the terminal last time, and the default beam is a transmit beam used by the terminal by default. The transmit beam used by the terminal by default may be configured by the network device for the terminal.

It should be noted that, usually, when the terminal has no explicit beam indication or has an implicit a beam indication, the terminal may transmit information by using the beam (including the default transmit beam or the default receive beam) used by the terminal by default. The beam used by the terminal by default is updatable. If the network device indicates a default receive beam to the terminal, the network device also maintains a transmit beam used by the network device by default, to ensure that the terminal can correctly receive, on the default receive beam, a signal sent by the network device by using the default transmit beam. If the network device indicates a default transmit beam to the terminal, the network device also maintains a receive beam used by the network device by default, to ensure that the network device can correctly receive, on the default receive beam, a signal sent by the terminal by using the default transmit beam.

It may be understood that if the terminal sends the ACK message to the network device and if the network device receives the ACK message in the $(n+k1)^{th}$ slot, the network device transmits the signal by using a second beam when a timing time of the timer T2 reaches the preset duration.

If the network device does not receive the ACK message or the NACK message in the $(n+k1)^{th}$ slot, the network device does not know whether the terminal successfully receives the beam configuration information, and therefore transmits the signal by using a beam used last time or a default beam regardless of whether a timing time of the timer T2 reaches the preset duration. In an $(n+k1+n2)^{th}$ slot, the network device resends the beam configuration information, that is, performs the beam configuration procedure again. Herein, n2 is an integer greater than or equal to 1, n2 may be a value configured by using signaling or may be a preset value, for example, a preset value in a protocol, and n2 may be equal or not equal to n1. Before the timing time of the timer T2 reaches the preset duration, the network device transmits the signal by using the beam used last time or the default beam, as shown in FIG. 2.

If the first beam is a transmit beam, the second beam is a receive beam. Transmitting the signal by using the second beam is specifically receiving, by using the second beam, the signal sent by the terminal by using the first beam. If the first beam is a receive beam, the second beam is a transmit beam. Transmitting the signal by using the second beam is specifically sending the signal to the terminal by using the second beam.

Descriptions are provided in FIG. 2 by using an example in which the network device transmits the signal by using a beam 1 in the $n^{th}$ slot and the terminal transmits the signal by using a beam a in the $n^{th}$ slot. The beam 1 is a beam corresponding to the beam a. For example, the beam 1 and the beam a belong to a same beam pair. The second beam is a beam corresponding to the first beam. For example, the second beam and the first beam belong to a same beam pair. It may be learned from FIG. 2 that when the timing time of the timer T1 reaches the preset duration, the terminal transmits the signal by using the first beam, and the network device transmits the signal by using the second beam.

If the terminal sends the NACK message to the network device and if the network device receives the NACK message in the $(n+k1)^{th}$ slot, the network device transmits the signal by using a beam used last time or a default beam. In an $(n+k1+n1)^{th}$ slot, the network device resends the beam configuration information, that is, performs the beam configuration procedure again. Herein, n1 is an integer greater than or equal to 1, and n1 may be a value configured by using signaling or may be a preset value, for example, a value stipulated in a protocol.

Alternatively, if the network device does not receive the ACK message or the NACK message in the $(n+k1)^{th}$ slot, the network device does not know whether the terminal successfully receives the beam configuration information, and therefore transmits the signal by using a beam used last time or a default beam regardless of whether a timing time of the timer T2 reaches the preset duration. In an $(n+k1+n2)^{th}$ slot, the network device resends the beam configuration information, that is, performs the beam configuration procedure again. Herein, n2 is an integer greater than or equal to 1, n2 may be a value configured by using signaling or may be a preset value, for example, a preset value in a protocol, and n2 may be equal or not equal to n1.

In the downlink beam configuration procedure, the beam used by the network device last time is a transmit beam used by the network device last time, and the default beam is a transmit beam used by the network device by default. The transmit beam used by the network device by default may be a transmit beam corresponding to the receive beam used by the terminal by default.

In the uplink beam configuration procedure, the beam used by the terminal last time is a receive beam used by the network device last time, and the default beam is a receive beam used by the network device by default. The receive beam used by the network device by default may be a receive beam corresponding to the transmit beam used by the terminal by default.

In this embodiment, when receiving the beam configuration information, the terminal starts the timer T1. When sending the beam configuration information, the network device starts the timer T2. In this way, if the terminal sends the ACK message to the network device in the $(n+k1)^{th}$ slot, the terminal transmits the signal by using the first beam when the timing time of the timer T1 reaches the preset duration. However, if the network device does not receive the ACK message in the $(n+k1)^{th}$ slot, the network device does not start transmitting the signal by using the second beam even if the timing time of the timer T2 reaches the preset duration. This causes behavior inconsistency between the network device and the terminal, and consequently quality of subsequent communication may be relatively poor and even mutual communication cannot be implemented. For example, FIG. 3 is a schematic diagram in this scenario. Descriptions are provided in FIG. 3 by using an example in which the network device transmits the signal by using a beam 1 in the $n^{th}$ slot and the terminal transmits the signal by using a beam a in the n'n slot. It may be learned from FIG.

3 that when the timing time of the timer T1 reaches the preset duration, the terminal transmits the signal by using the first beam, and in this case, the network device still transmits the signal by using the beam 1.

Based on this, this application provides the following beam configuration method:

Embodiment 1

FIG. 4 to FIG. 7 are schematic diagrams of a beam configuration method according to this embodiment. For explanations of related content in this embodiment, refer to the foregoing descriptions. The method provided in this embodiment may include the following steps.

S201: A network device sends beam configuration information to a terminal in an $n^{th}$ slot, where n is an integer greater than or equal to 0, and the beam configuration information is used to instruct the terminal to transmit a signal on a first beam.

If the first beam is a receive beam, a beam configuration procedure provided in this embodiment is specifically a downlink beam configuration procedure. If the first beam is a transmit beam, a beam configuration procedure provided in this embodiment is specifically an uplink beam configuration procedure.

S202: The terminal receives the beam configuration information in the $n^{th}$ slot.

S203: The terminal checks the beam configuration information.

If the check succeeds, the terminal sends an ACK message to the network device and starts a timer T1 in an $(n+k1)^{th}$ slot. When a timing time of the timer T1 reaches preset duration, the terminal transmits the signal by using the first beam, as shown in FIG. 4 to FIG. 7. Before the timing time of the timer T1 reaches the preset duration, the terminal transmits the signal by using a beam used last time or a default beam.

If the check fails, the terminal sends a NACK message to the network device in an $(n+k1)^{th}$ slot. In this case, the terminal does not start a timer T1, and therefore transmits the signal by using a beam used last time or a default beam.

The network device may perform step S204a, S204b, or S204c. It may be understood that if the terminal sends the ACK message to the network device in step S203, the network device may perform step S204a or S204c. If the terminal sends the NACK message to the network device in step S203, the network device may perform step S204b or S204c.

Figure 4:
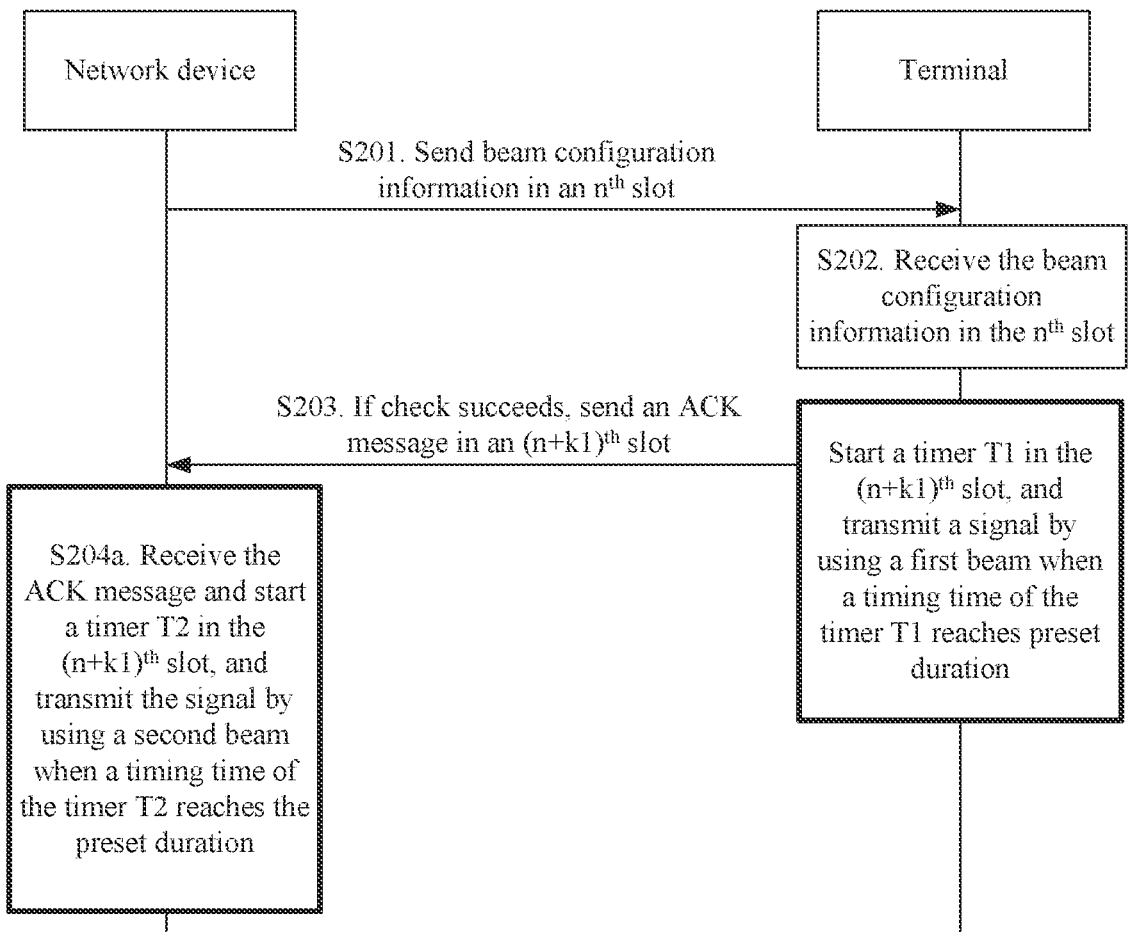
FIG. 4 is a first interaction flowchart of a beam configuration method according to an embodiment of this application.
Figure 5:
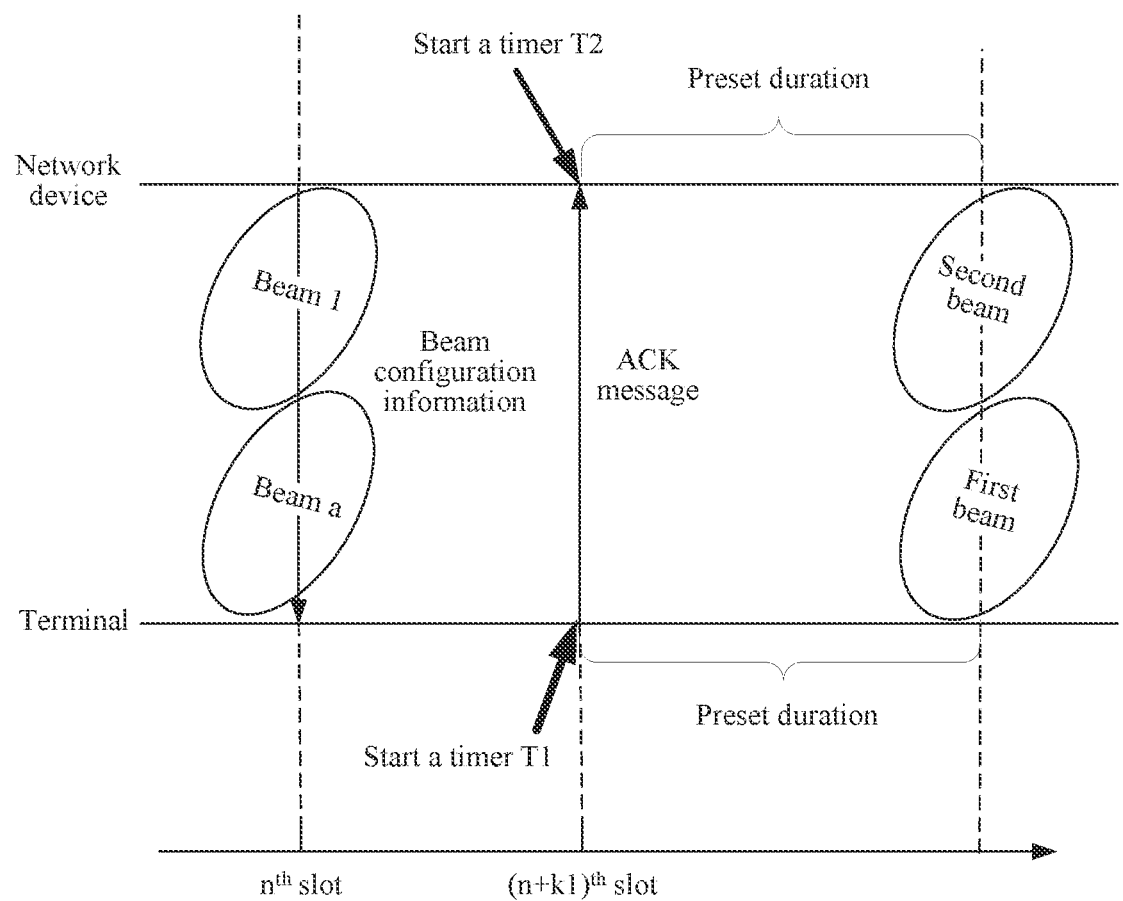
FIG. 5 is a schematic diagram that is based on a beam configuration procedure shown in FIG. 4 according to an embodiment of this application.

S204a: The network device starts a timer T2 if receiving an ACK message in an (n+k1)*n slot, and then transmits the signal by using a second beam when a timing time of the timer T2 reaches preset duration, as shown in FIG. 4 and FIG. 5. Before the timing time of the timer T2 reaches the preset duration, the network device transmits the signal by using a beam used last time or a default beam. Descriptions are provided in FIG. 5 by using an example in which the network device transmits the signal by using a beam 1 in the $n^{th}$ slot and the terminal transmits the signal by using a beam a in the $n^{th}$ slot.

It may be learned with reference to FIG. 4 and FIG. 5 that the network device and the terminal start respective timers in the $(n+k1)^{th}$ and transmit the signal by using the first beam/the second beam when the timers reach the same preset duration. Therefore, behavior of the terminal is consistent with that of the network device, so that signal transmission performance can be improved.

S204b: The network device resends the beam configuration information, that is, performs a beam configuration procedure again, in an $(n+k1+n1)^{th}$ slot if receiving a NACK message in an $(n+k1)^{th}$ slot.

It should be noted that before the beam configuration procedure is performed again, the terminal does not start the timer T1 and the network device does not start the timer T2. Therefore, for the beam configuration procedure performed again, refer to the beam configuration procedure described in steps S201 to S204, and details are not described herein again. It may be understood that in a process of performing the beam configuration procedure again, if step S204a is specifically performed when S204 is performed, the procedure ends after S204a is performed. If S204b or S204c is specifically performed, the beam configuration procedure may be performed again, by analogy, until step S204a is performed at last when a beam configuration procedure is performed, and the procedure ends. In a specific implementation, a maximum value of a quantity of times of performing a beam configuration procedure for same beam configuration information may be set, so that when the quantity of times of performing the beam configuration procedure for the same beam configuration information reaches the maximum value, the procedure ends if the network device still does not receive an ACK message. Certainly, this application is not limited thereto.

It may be understood that before the beam configuration procedure is performed again, the terminal does not start the timer T1 and the network device does not start the timer T2. Therefore, before the beam configuration procedure is performed again, the terminal and the network device each transmit the signal by using the beam used last time or the default beam.

S204c: The network device resends the beam configuration information, that is, performs a beam configuration procedure again, in an $(n+k1+n2)^{th}$ slot if the network device does not receive an ACK message or a NACK message in an $(n+k1)^{th}$ slot.

Figure 6:
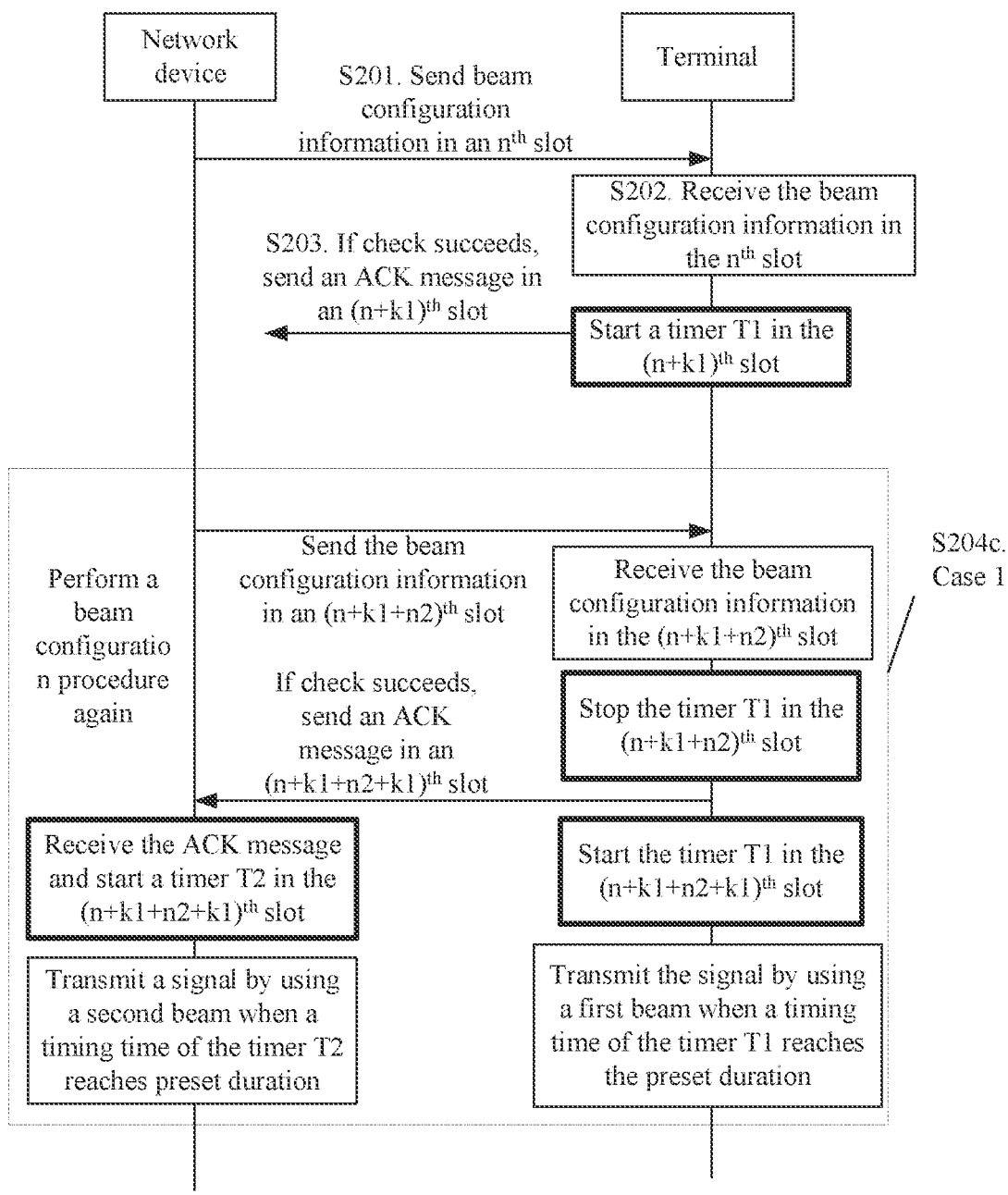
FIG. 6 is a second interaction flowchart of a beam configuration method according to an embodiment of this application.
Figure 7:
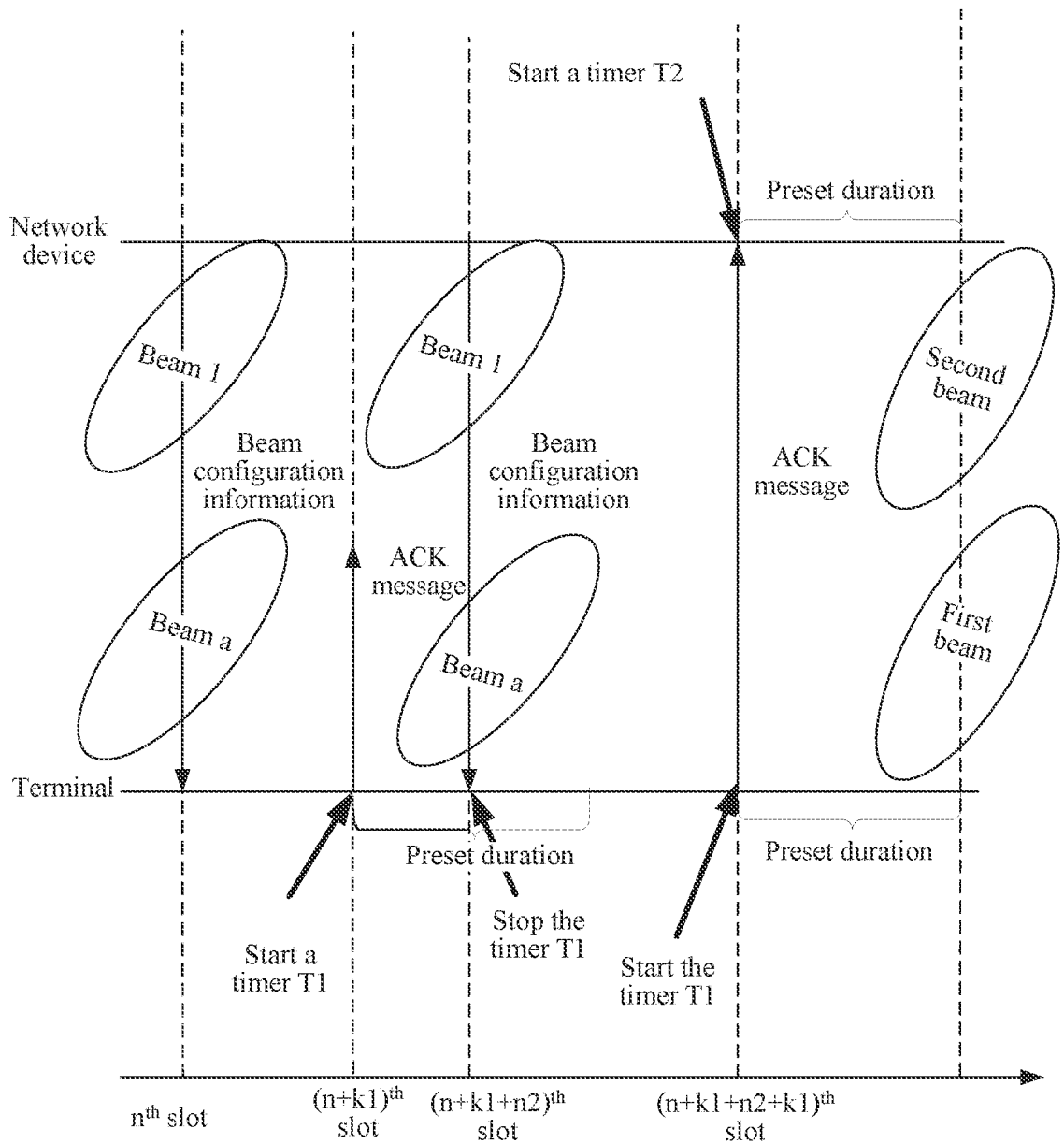
FIG. 7 is a schematic diagram that is based on a beam configuration procedure shown in FIG. 6 according to an embodiment of this application.

When the beam configuration procedure is performed again, the following two cases may be specifically included:

Case 1: If the terminal sends the ACK message to the network device in step S203, before the beam configuration procedure is performed again, the terminal has started the timer T1, but the network device does not start the timer T2. In this case, the terminal may stop the timer T1 when receiving the resent beam configuration information, that is, in the $(n+k1+n2)^{th}$ slot, and then start the timer T1 when sending an ACK message for the re-received beam configuration information to the network device, as shown in FIG. 6 and FIG. 7. In this way, it can be ensured that the timer T2 of the network device and the timer T1 of the terminal simultaneously start timing when the beam configuration procedure is performed again, so that the timers can simultaneously reach the preset duration, and when the terminal feeds back the ACK message to the network device and the network device receives the ACK message, the terminal transmits the signal by using the first beam and the network device transmits the signal by using the second beam, that is, behavior of the terminal is consistent with that of the network device, thereby improving signal transmission performance. For other steps of the beam configuration procedure performed again, refer to related steps in the beam configuration procedure described in steps S201 to S204, and details are not described herein again. Descriptions are provided in FIG. 6 and FIG. 7 by using an example in which in the process of performing the beam configuration procedure again, the terminal sends an ACK message to the network device in an $(n+k1+n2+k1)^{th}$ slot and the network device receives the ACK message in the $(n+k1+n2+k1)^{th}$ slot. Certainly, this application is not limited thereto. Descriptions are provided in FIG. 7 by using an example in which the network device transmits the signal by using a beam 1 in the $n^{th}$ slot and the terminal transmits the signal by using a beam a in the $n^{th}$ slot.

Case 2: If the terminal sends the NACK message to the network device in step S203, before the beam configuration procedure is performed again, the terminal does not start the timer T1 and the network device does not start the timer T2. Therefore, for the beam configuration procedure performed again, refer to the beam configuration procedure described in steps S201 to S204a, S204b, or S204c, and details are not described herein again. For descriptions of the beam configuration procedure performed again and the beams used by the terminal and the network device before the beam configuration procedure is performed again, refer to related content in step S204b, and details are not described herein again.

In this embodiment, the terminal starts the timer T1 when sending the ACK message for the beam configuration information to the network device. The network device starts the timer T2 when receiving the ACK message. It may be learned with reference to FIG. 4 to FIG. 7 and the foregoing analysis that the technical solution provided in this embodiment can ensure behavior consistency between the terminal and the network device both when the network device receives the ACK message or the NACK message for the beam configuration information and when the network device does not receive the ACK message or the NACK message, thereby improving signal transmission performance.

Embodiment 2

FIG. 8 to FIG. 11 are schematic diagrams of a beam configuration method according to this embodiment. For explanations of related content in this embodiment, refer to the foregoing descriptions. The method provided in this embodiment may include the following steps.

For steps S301 and S302, refer to steps S201 and S202. Certainly, this application is not limited thereto.

In this embodiment, the first beam is a receive beam, and a second beam is a transmit beam, that is, a beam configuration procedure provided in this embodiment is specifically a downlink beam configuration procedure.

S303: The terminal checks the beam configuration information.

If the check succeeds, the terminal sends an ACK message to the network device and starts a timer T1 in an $(n+k1)^{th}$ slot. When a timing time of the timer T1 reaches preset duration, the terminal receives the signal by using each beam in a beam set, as shown in FIG. 8 to FIG. 11. Before the timing time of the timer T1 reaches the preset duration, the terminal receives the signal by using a beam used last time or a default beam.

If the check fails, the terminal sends a NACK message to the network device in an $(n+k1)^{th}$ slot. In this case, the terminal does not start a timer T1, and therefore receives the signal by using a beam used last time or a default beam.

In addition to the first beam, the beam set may further include at least one of the following beams: the receive beam used by the terminal last time, the receive beam used by the terminal by default, a beam covering the first beam, or the like. Each beam has specific coverage. The beam covering the first beam is a beam whose coverage includes coverage of the first beam.

The network device may perform step S304a, S304b, or S304c. It may be understood that if the terminal sends the ACK message to the network device in step S303, the network device may perform step S304a or S304c. If the terminal sends the NACK message to the network device in step S303, the network device may perform step S304b or S304c.

S304a: The network device starts a timer T2 if receiving an ACK message in an $(n+k1)^{th}$ slot, and sends the signal by using a second beam when a timing time of the timer T2 reaches preset duration. It may be understood that if subsequently sending a signal to the terminal, the network device specifically sends the signal on the second beam. The terminal receives the signal on the first beam.

S304b: The network device resends the beam configuration information, that is, performs a beam configuration procedure again, in an $(n+k1+n1)^{th}$ slot if receiving a NACK message in an $(n+k1)^{th}$ slot. For the beam configuration procedure performed again, refer to related descriptions in step S204b, and details are not described herein again.

S304c: The network device sends the signal by using a beam used last time or a default beam if the network device does not receive an ACK message or a NACK message in an $(n+k1)^{th}$ slot. It may be understood that if subsequently sending a signal to the terminal, the network device specifically sends the signal on a beam other than the second beam. The terminal usually receives the signal on a beam other than the first beam.

It may be understood that only when the terminal sends the ACK message to the network device in the $(n+k1)^{th}$ slot, that is, the terminal successfully checks the beam configuration information, the terminal can learn of the first beam configured by using the beam configuration information, and further can distinguish between the first beam and the beam other than first beam. In this case, the network device may receive the ACK message or may not receive the ACK message. Based on this, when the terminal sends the ACK message, the terminal may subsequently perform step S305. When the terminal sends the NACK message, for processing procedures of both the network device and the terminal, refer to related descriptions in Embodiment 1 above, and details are not described herein again.

The terminal may perform step S305a, S305b, or S305c. It may be understood that if step S304a is specifically performed in step S304, step S305a or S305c may be performed in step S305. If the ACK message is not received in step S304c, step S305b or S305c may be performed.

Figure 8:
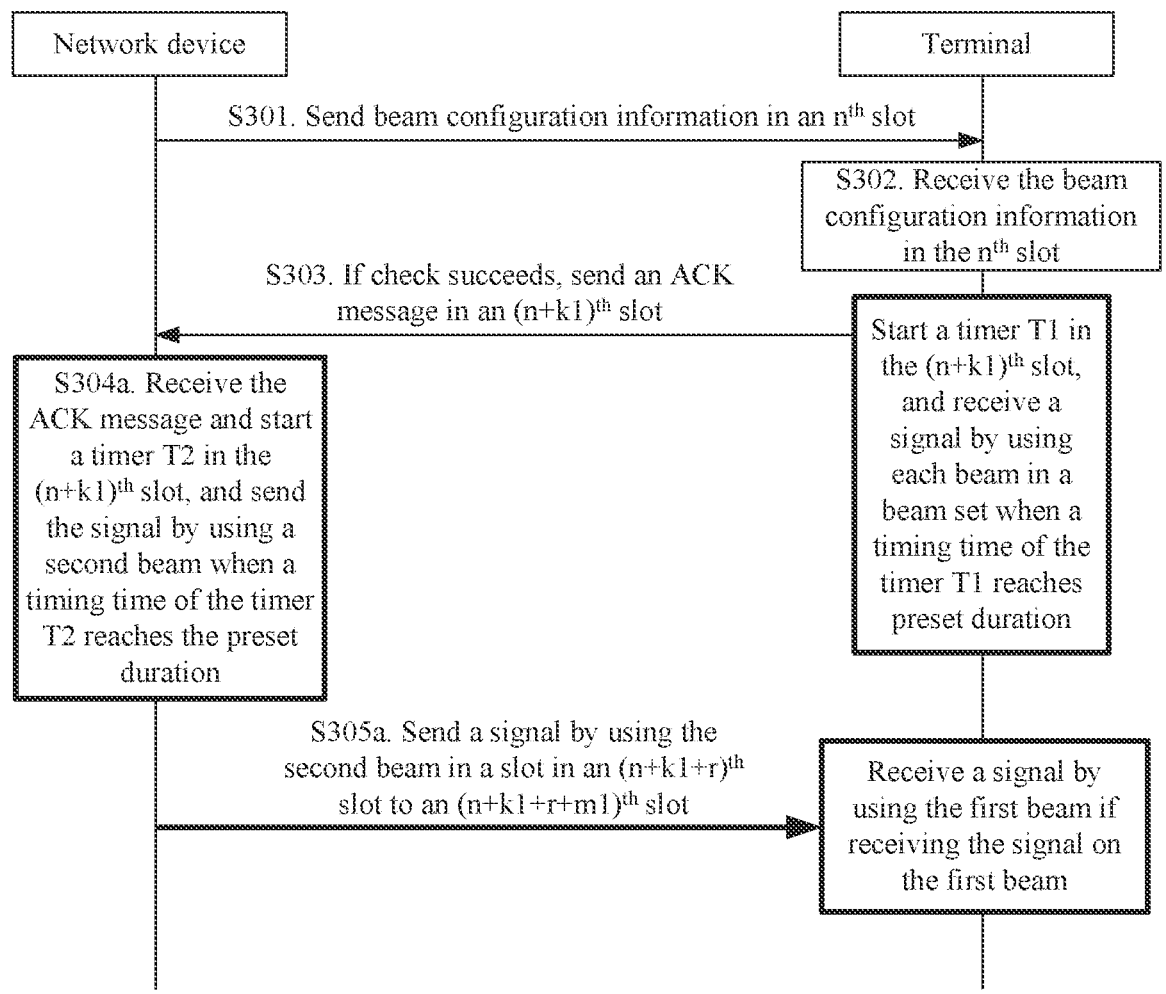
FIG. 8 is a third interaction flowchart of a beam configuration method according to an embodiment of this application.
Figure 9:
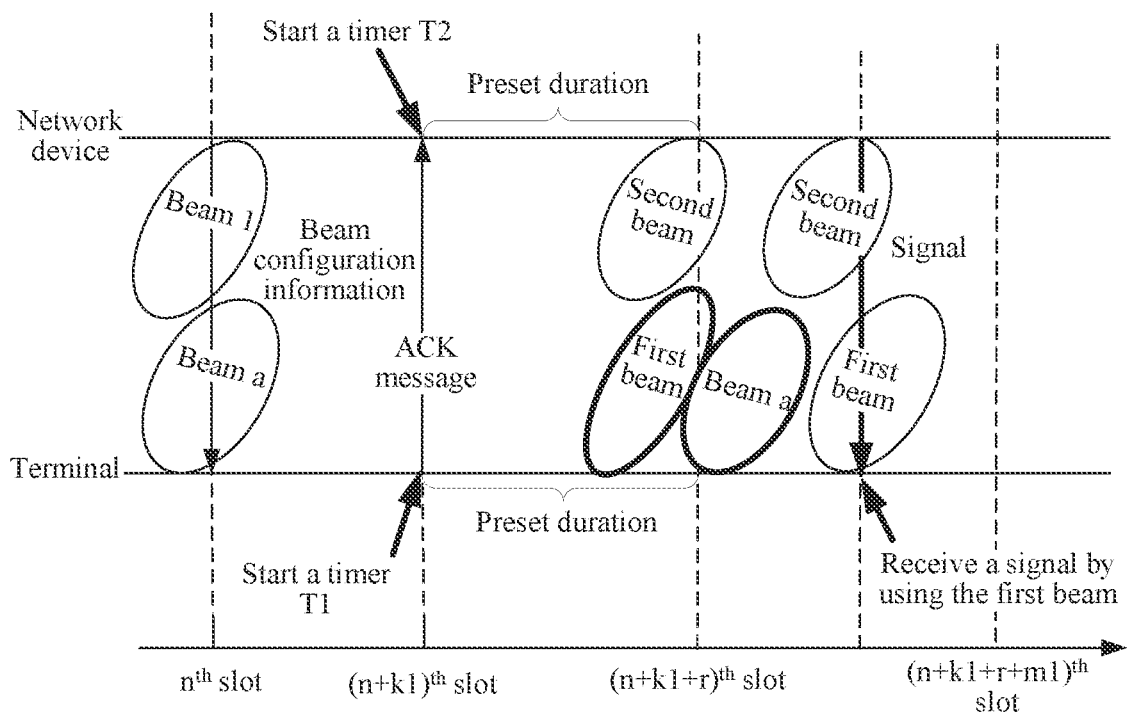
FIG. 9 is a schematic diagram that is based on a beam configuration procedure shown in FIG. 8 according to an embodiment of this application.

S305a: If the terminal receives a signal on the first beam in a slot in an $(n+k1+r)^{th}$ slot to an $(n+k1+r+m1)^{th}$ slot, it indicates that the network device sends the signal by using the second beam in the slot, that is, the network device receives the ACK message in the $(n+k1)^{th}$ slot, and therefore the terminal receives a signal by using the first beam, as shown in FIG. 8 and FIG. 9. In this way, behavior consistency between the network device and the terminal can be achieved, thereby improving information transmission efficiency. Herein, r is the preset duration, m1 is an integer greater than or equal to 1, and m1 may be a value configured by using signaling or may be a preset value, for example, a value stipulated in a protocol.

S305b: If the terminal receives a signal on a beam other than the first beam (in other words, a beam that is not the first beam) in a beam set in an $(n+k1+r)$ slot to an $(n+k1+r+m1)^{th}$ slot, it indicates that the network device does not receive the ACK message in the $(n+k1)^{th}$ slot, and therefore the terminal may continue to perform one of the following two manners:

Manner 1: The terminal sends an ACK message to the network device, starts a timer T1, and receives a signal by using each beam in the beam set when a timing time of the timer T1 reaches the preset duration. In this manner, the terminal may send the ACK message to the network device in a same slot in which the signal is received or in several slots after the slot.

Figure 10:
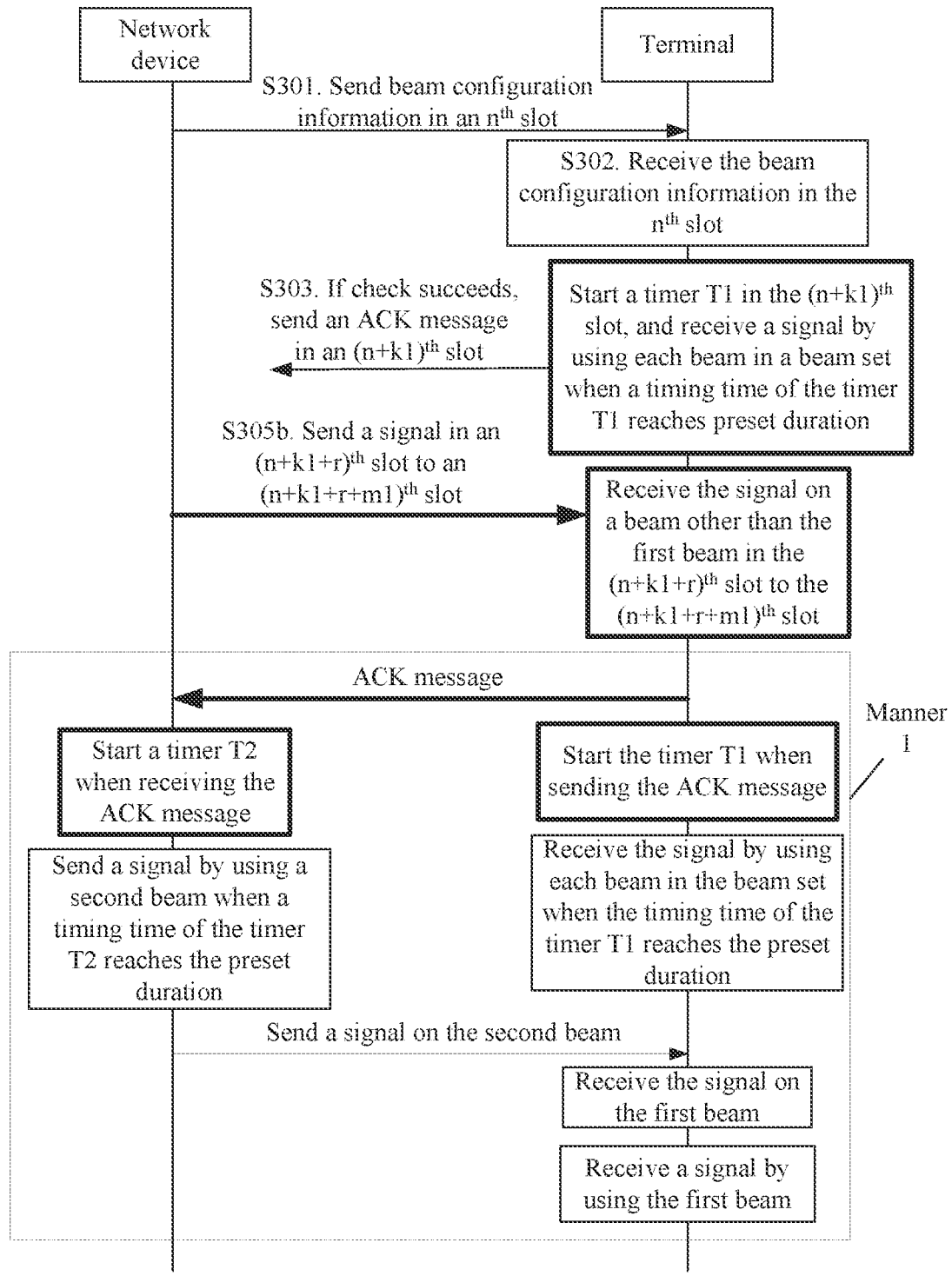
FIG. 10 is a fourth interaction flowchart of a beam configuration method according to an embodiment of this application.

Subsequently, the network device starts the timer T2 when receiving the ACK message, and sends the signal by using the second beam when the timing time of the timer T2 reaches the preset duration. Next, step S305a, S305b, or S305c may be performed again, as shown in FIG. 10. Descriptions are provided in FIG. 10 by using an example in which step S305b is specifically performed.

It may be understood that in the $(n+k1+r)^{th}$ slot, the timing time of the timer T1 started by the terminal in the $(n+k1)^{th}$ slot has reached the preset duration, and usually the timer automatically stops timing when the timing time of the timer T1 reaches the preset duration. Therefore, in the manner 1, the terminal may re-start the timer T1 instead of resetting the timer T1.

Figure 11:
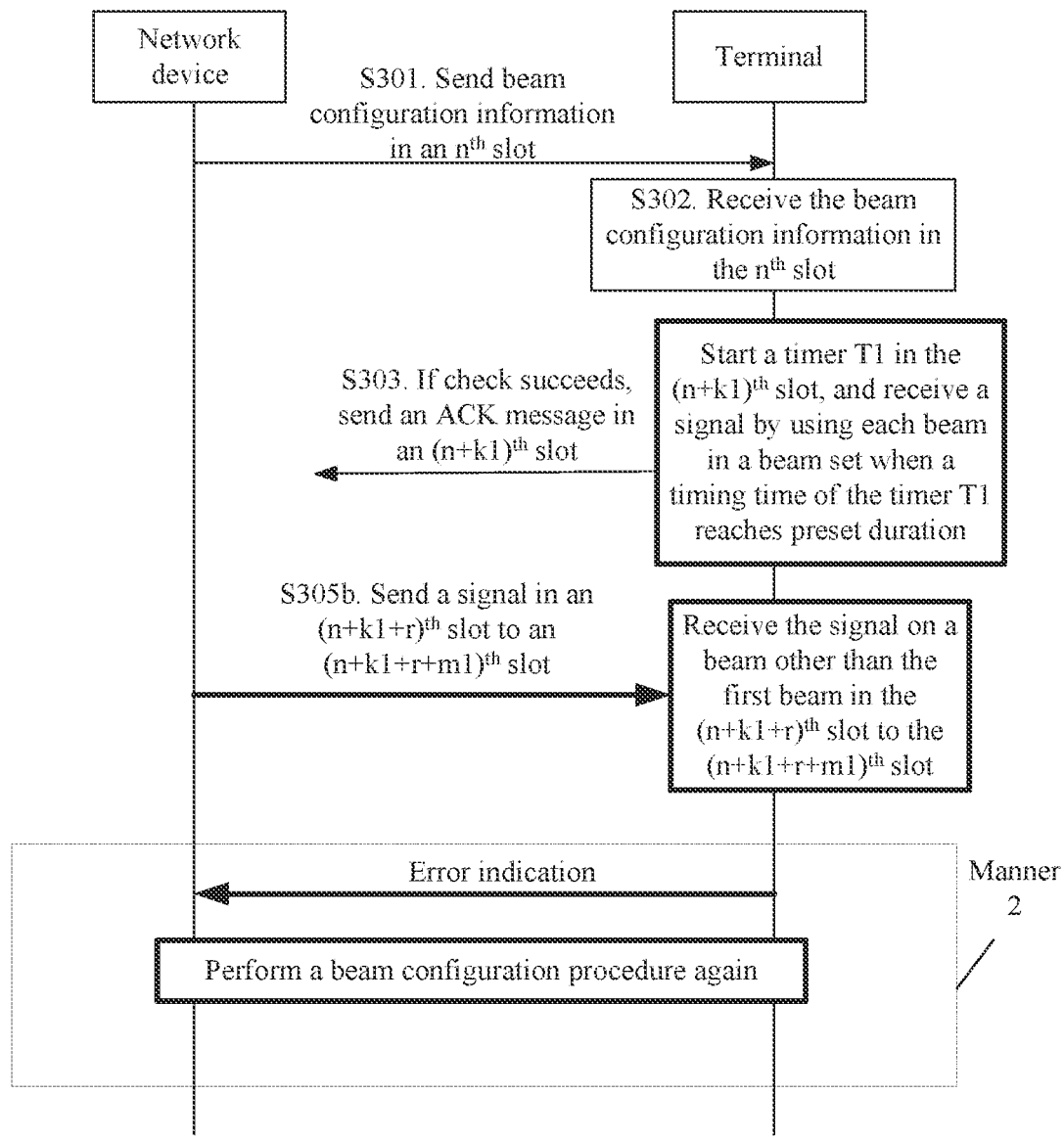
FIG. 11 is a fifth interaction flowchart of a beam configuration method according to an embodiment of this application.

Manner 2: The terminal sends an error indication to the network device, where the error indication is used to instruct the network device to resend the beam configuration information to the terminal. As shown in FIG. 11, for related descriptions of the beam configuration procedure performed again, refer to the foregoing descriptions, and details are not described herein again.

S305c: If the terminal does not receive a signal in an $(n+k1+r)^{th}$ slot to an $(n+k1+r+m1)^{th}$ slot, the terminal sends a beam configuration request to the network device, where the beam configuration request is used to request the network device to resend the beam configuration information to the terminal. For related descriptions of the beam configuration procedure performed again, refer to the foregoing descriptions, and details are not described herein again.

It should be noted that the technical solution provided in this embodiment may be applied to a scenario in which the terminal supports multi-beam transmission. In a specific implementation, the network device may learn of a capability of the terminal in a manner such as sending, by the network device, indication information to the terminal to learn of whether the terminal has a capability of supporting multi-beam transmission, or actively reporting, by the terminal to the network device, whether the terminal has a capability of supporting multi-beam transmission. Therefore, the network device supports the method provided in this embodiment.

In this embodiment, the terminal starts the timer T1 when sending the ACK message for the beam configuration information to the network device. The network device starts the timer T2 when receiving the ACK message. In addition, the terminal receives, when the timing time of the timer T1 reaches the preset duration, the signal by using beams including the first beam configured by using the beam configuration information. It may be learned with reference to FIG. 8 to FIG. 11 and the foregoing analysis that the technical solution provided in this embodiment can ensure behavior consistency between the terminal and the network device in the downlink beam configuration procedure both when the network device receives the ACK message or the NACK message for the beam configuration information and when the network device does not receive the ACK message or the NACK message, thereby improving signal transmission performance.

Embodiment 3

Figure 12:
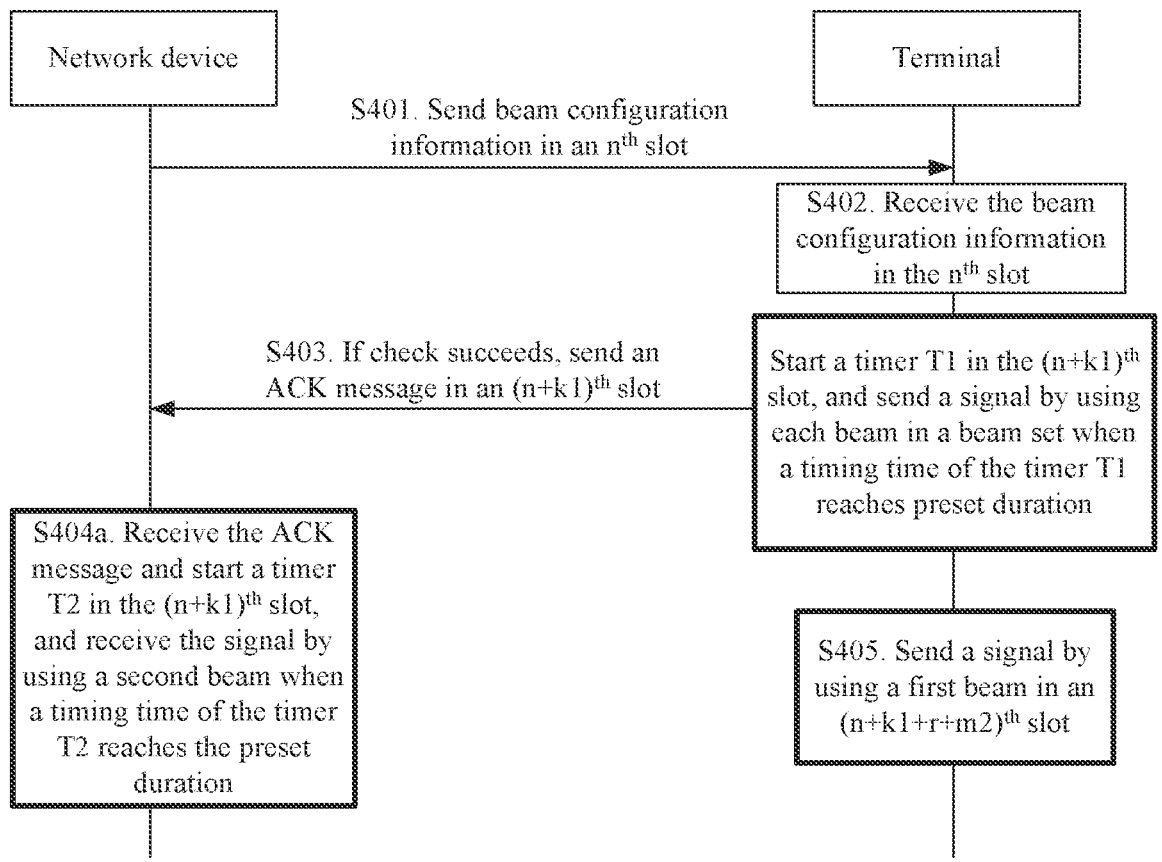
FIG. 12 is a sixth interaction flowchart of a beam configuration method according to an embodiment of this application.

FIG. 12 is a schematic diagram of a beam configuration method according to this embodiment. For explanations of related content in this embodiment, refer to the foregoing descriptions. The method provided in this embodiment may include the following steps.

For steps S401 and S402, refer to steps S201 and S202. Certainly, this application is not limited thereto.

In this embodiment, the first beam is a transmit beam, and a second beam is a receive beam, that is, a beam configuration procedure provided in this embodiment is specifically an uplink beam configuration procedure.

S403: The terminal checks the beam configuration information.

If the check succeeds, the terminal sends an ACK message to the network device and starts a timer T1 in an $(n+k1)^{th}$ slot. When a timing time of the timer T1 reaches preset duration, the terminal sends the signal by using each beam in a beam set, as shown in FIG. 12. Before the timing time of the timer T1 reaches the preset duration, the terminal transmits the signal by using a beam used last time or a default beam.

If the check fails, the terminal sends a NACK message to the network device in an $(n+k1)^{th}$ slot. In this case, the terminal does not start a timer T1, and therefore transmits the signal by using a beam used last time or a default beam.

In addition to the first beam, the beam set may further include at least one of the following beams: the transmit beam used by the terminal last time, the transmit beam used by the terminal by default, a beam covering the first beam, or the like.

The network device may perform step S404a, S404b, or S404c. It may be understood that if the terminal sends the ACK message to the network device in step S403, the network device may perform step S404a or S404c. If the terminal sends the NACK message to the network device in step S403, the network device may perform step S404b or S404c.

S404a: The network device starts a timer T2 if receiving an ACK message in an $(n+k1)^{th}$ slot, and receives the signal by using a second beam when a timing time of the timer T2 reaches preset duration, as shown in FIG. 12.

S404b: The network device resends the beam configuration information, that is, performs a beam configuration procedure again, in an $(n+k1+n1)^{th}$ slot if receiving a NACK message in an $(n+k1)^{*d}$ slot. For the beam configuration procedure performed again, refer to related descriptions in step S204b, and details are not described herein again.

S404c: The network device receives the signal by using a beam used last time or a default beam if the network device does not receive an ACK message or a NACK message in an $(n+k1)^{th}$ slot.

It may be understood that only when the terminal sends the ACK message to the network device in the $(n+k1)^{th}$ slot, that is, the terminal successfully checks the beam configuration information, the terminal can learn of information about the first beam configured by using the beam configuration information, and can further distinguish between the first beam and a beam other than the first beam. In this case, the network device may receive the ACK message or may not receive the ACK message. Based on this, when the terminal sends the ACK message, the terminal may subsequently perform step S405. When the terminal sends the NACK message, for processing procedures of both the network device and the terminal, refer to related descriptions in Embodiment 1 above, and details are not described herein again.

S405. The terminal sends a signal by using the first beam in an $(n+k1+r+m2)^{th}$ slot, as shown in FIG. 12.

Subsequently, if the network device receives a signal on a beam other than the second beam in an $(n+k1+r)^{th}$ slot to the $(n+k1+r+m2)^{th}$ slot, it indicates that the terminal sends the signal by using a plurality of beams, that is, the terminal successfully receives the beam configuration information. Therefore, the beam configuration procedure ends. Alternatively, if the network device receives no signal in an $(n+k1+r)^{th}$ slot to the $(n+k1+r+m2)^{th}$ slot, the beam configuration procedure is performed again. For the beam configuration procedure performed again, refer to related descriptions in step S204c. It may be understood that, different from step S204c, in step S404c, the signal is sent by using each beam in the beam set when the timing time of the timer T1 of the terminal reaches the preset duration.

In this embodiment, the terminal starts the timer T1 when sending the ACK message for the beam configuration information to the network device. The network device starts the timer T2 when receiving the ACK message. In addition, the terminal sends, when the timing time of the timer T1 reaches the preset duration, the signal by using beams including the first beam configured by using the beam configuration information. It may be learned with reference to FIG. 12 and the foregoing analysis that the technical solution provided in this embodiment can ensure behavior consistency between the terminal and the network device in the uplink configuration procedure both when the network device receives the ACK message or the NACK message for the beam configuration information and when the network device does not receive the ACK message or the NACK message, thereby improving signal transmission performance.

Embodiment 4

Figure 13:
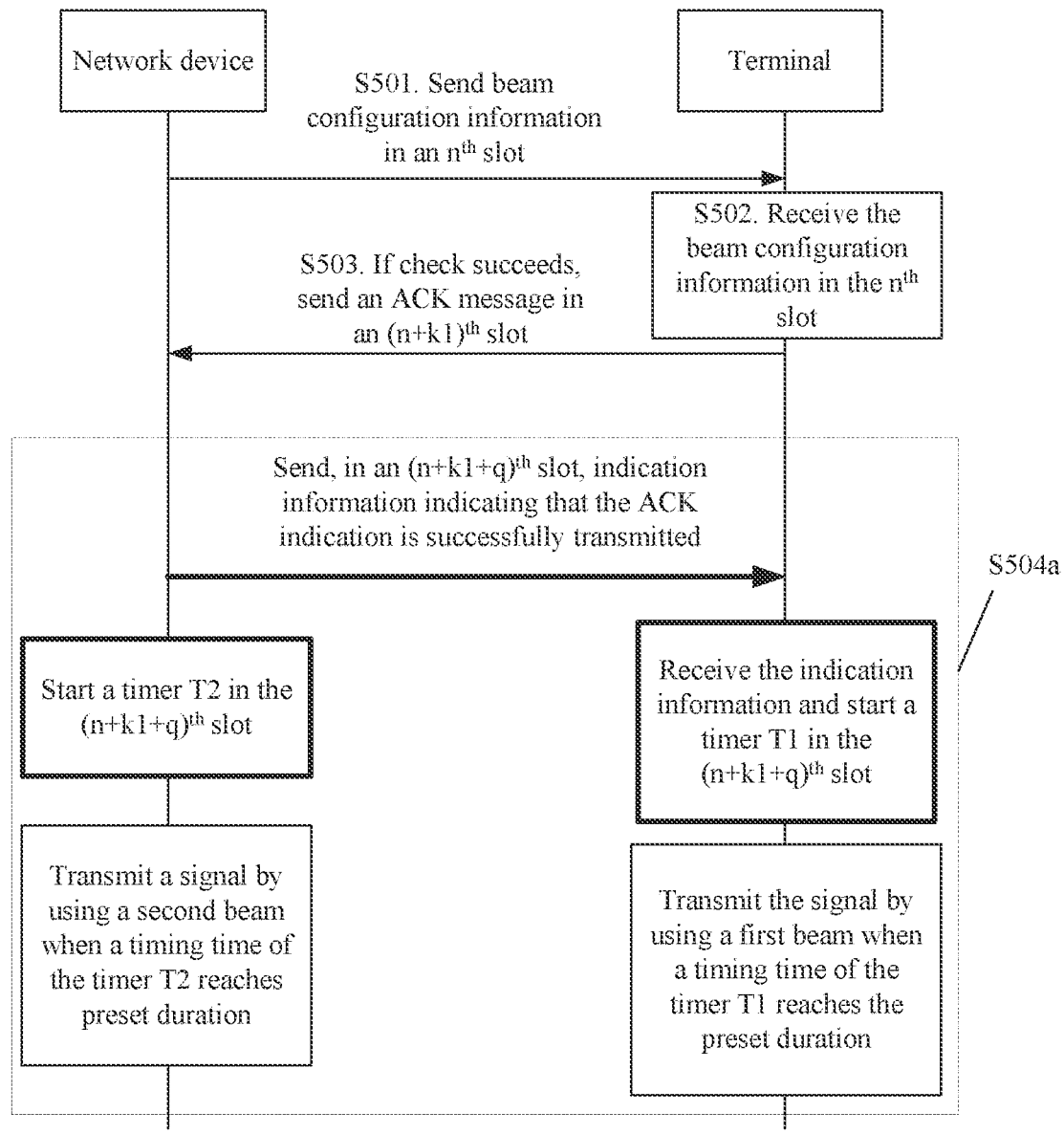
FIG. 13 is a seventh interaction flowchart of a beam configuration method according to an embodiment of this application.
Figure 14:
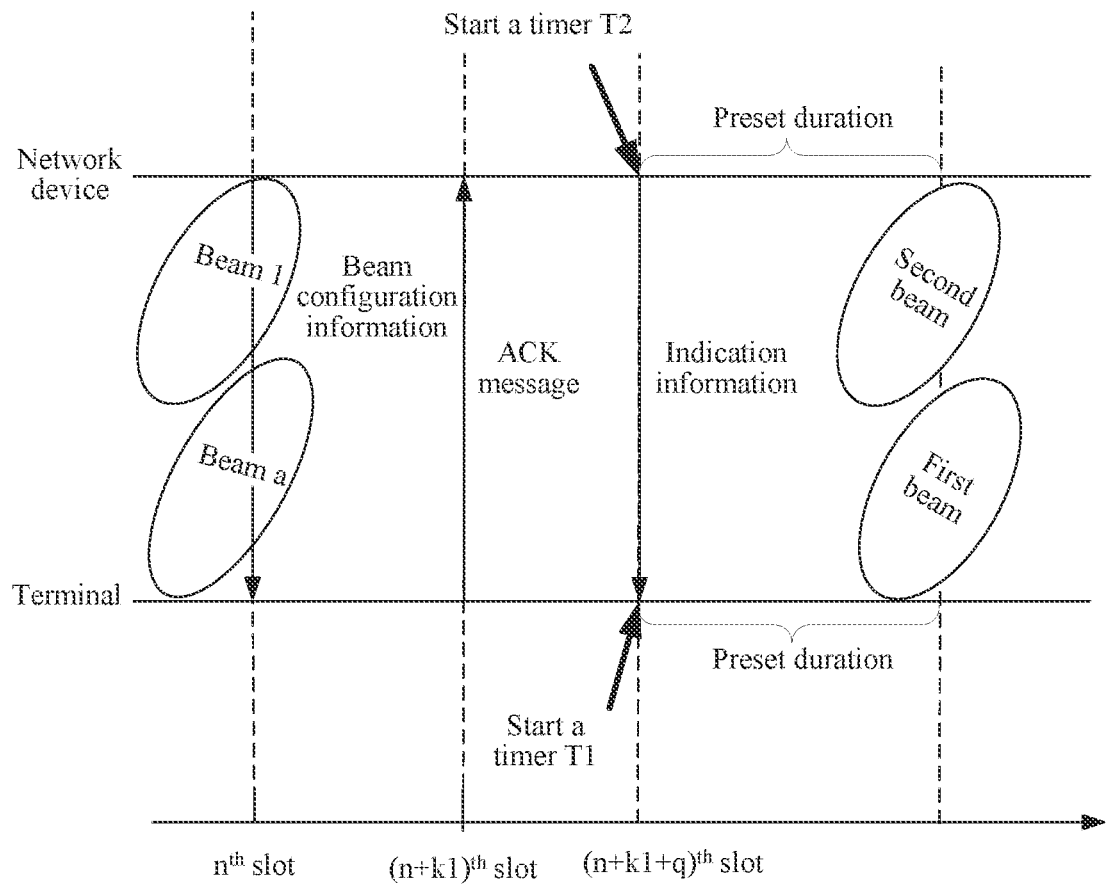
FIG. 14 is a schematic diagram that is based on a beam configuration procedure shown in FIG. 13 according to an embodiment of this application.

FIG. 13 and FIG. 14 are schematic diagrams of a beam configuration method according to this embodiment. For explanations of related content in this embodiment, refer to the foregoing descriptions. The method provided in this embodiment may include the following steps.

S501: A network device sends beam configuration information to a terminal in an $n^{th}$ slot, where n is an integer greater than or equal to 0, and the beam configuration information is used to instruct the terminal to transmit a signal on a first beam.

If the first beam is a receive beam, a beam configuration procedure provided in this embodiment is specifically a downlink beam configuration procedure. If the first beam is a transmit beam, a beam configuration procedure provided in this embodiment is specifically an uplink beam configuration procedure.

S502: The terminal receives the beam configuration information in the $n^{th}$ slot.

S503: The terminal checks the beam configuration information.

If the check succeeds, the terminal sends an ACK message to the network device in an $(n+k1)^{th}$ slot.

If the check fails, the terminal sends a NACK message to the network device in an $(n+k1)^{th}$ slot.

It may be understood that if the terminal sends the ACK message to the network device in step S503, the network device may perform step S504a or S504c. If the terminal sends the NACK message to the network device in step S503, the network device may perform step S504b or S504c.

S504a: If receiving an ACK message in an $(n+k1)^{th}$ slot, the network device sends, to the terminal in an $(n+k1+q)^{th}$ slot, indication information indicating that the ACK message is successfully transmitted, starts a timer T2 when sending the indication information, and then transmits the signal by using a second beam when a timing time of the timer T2 reaches preset duration.

Subsequently, the terminal receives, in the $(n+k1+q)^{th}$ slot, the indication information indicating that the ACK message is successfully transmitted, starts a timer T1 when receiving the indication information, that is, in the $(n+k1+q)^{th}$ slot, and then transmits the signal by using the first beam when a timing time of the timer T1 reaches the preset duration, as shown in FIG. 13 and FIG. 14. Descriptions are provided in FIG. 14 by using an example in which the network device transmits the signal by using a beam 1 in the $n^{th}$ slot and the terminal transmits the signal by using a beam a in the $n^{th}$ slot.

Herein, q is an integer greater than or equal to 1, and q may be a value configured by using signaling or may be a preset value, for example, a value stipulated in a protocol.

S504b: The network device resends the beam configuration information to the terminal, that is, performs a beam configuration procedure again, in an $(n+k1+n1)^{th}$ slot if receiving a NACK message in an $(n+k1)^{th}$ slot. For the beam configuration procedure performed again, refer to the foregoing procedure, and details are not described herein again.

S504c: The network device resends the beam configuration information to the terminal, that is, performs a beam configuration procedure again, in an $(n+k1+n2)^{th}$ slot if the network device does not receive an ACK message or a NACK message in an $(n+k1)^{th}$ slot. For the beam configuration procedure performed again, refer to steps S501 to S504, and details are not described herein again.

In this embodiment, three-way handshake (for example, step S501, step S503, and a step of sending/receiving the indication information in step S504a in FIG. 13) is performed between the network device and the terminal. In addition, the network device starts the timer T2 when sending, to the terminal, the indication information indicating that the ACK message for the beam configuration information is successfully transmitted. The terminal starts the timer T1 when receiving the indication information. In addition, the terminal and the network device transmit the signal by using the first beam/the second beam when timing times of respective timers reach the same preset duration, so that behavior of the terminal is consistent with that of the network device, thereby improving signal transmission performance. The network device does not send the indication information both when the network device receives the NACK message and when the network device does not receive the ACK message or the NACK message. Therefore, neither the network device nor the terminal starts the timer. In these two cases, when the beam configuration procedure is performed again, a procedure shown in FIG. 13 may be performed, so that behavior of the terminal is consistent with that of the network device.

It should be noted that a same parameter may have a same value or different values in any two of the foregoing embodiments. For example, the preset duration in the embodiments may be the same or may be different. For another example, n1 in the embodiments may be the same or may be different. Other examples are not listed herein one by one.

In addition, it should be noted that Embodiment 1 and Embodiment 4 may be applied to a scenario in which the terminal supports multi-beam transmission, or may be applied to a scenario in which the terminal supports single-beam transmission Embodiment 2 and Embodiment 3 are applicable to the scenario in which the terminal supports multi-beam transmission. Whether the terminal supports multi-beam transmission is determined based on a configuration of the terminal. The multi-beam transmission is sending a signal or receiving a signal by using a plurality of beams. In an actual implementation, optionally, the network device may send indication information to the terminal to instruct the terminal to report whether the terminal has a capability of supporting multi-beam transmission; or the terminal may actively report, to the network device, whether the terminal has a capability of supporting multi-beam transmission; or another manner may be used. After learning of whether the terminal has the capability of supporting multi-beam transmission, the network device may instruct, by using configuration information, the terminal to transmit a signal by using a plurality of beams or not by using a plurality of beams. In addition, the network device may instruct, by using the configuration information, the terminal to perform beam configuration in a manner in Embodiment 1 to Embodiment 4.

The solutions provided in the embodiments of this application are mainly described above from the perspective of method. To achieve the foregoing functions, the terminal or the network device each include a corresponding hardware structure and/or software module for performing the functions. A person skilled in the art should be easily aware that, in combination with units and algorithm steps of the examples described in the embodiments disclosed in this specification, this application can be implemented by hardware or a combination of hardware and computer software. Whether a function is performed by hardware or by computer software driving hardware depends on particular applications and design constraint conditions of the technical solutions. A person skilled in the art may use different methods to implement the described functions for each particular application, but it should not be considered that the implementation goes beyond the scope of this application.

In the embodiments of this application, the terminal and the network device may be divided into function modules according to the foregoing method examples. For example, function modules may be obtained through division based on functions, or two or more functions may be integrated into one processing module. The integrated module may be implemented in a form of hardware, or may be implemented in a form of a software function module. It should be noted that module division in the embodiments of this application is an example and is merely logical function division. In an actual implementation, there may be another division manner.

Figure 15:
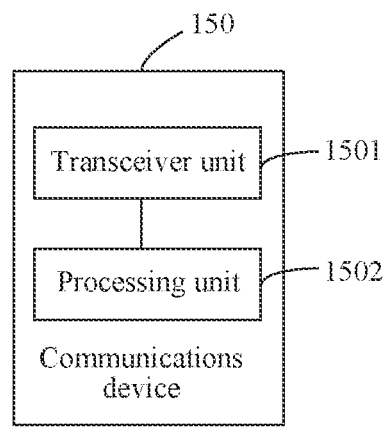
FIG. 15 is a first schematic structural diagram of a communications device according to an embodiment of this application.

FIG. 15 shows a communications device according to an embodiment of this application. The communications device shown in FIG. 15 may include a transceiver unit 1501 and a processing unit 1502. The communications device may be a terminal or may be a network device.

If the communications device 150 is a terminal, the terminal may be configured to perform a step performed by the terminal in any one of Embodiment 1 to Embodiment 4.

When the communications device 150 is applied to Embodiment 1 to Embodiment 3:

In a possible design, the transceiver unit 1501 is configured to receive beam configuration information sent by a network device, where the beam configuration information is used to instruct the terminal to transmit a signal by using a first beam. The processing unit 1502 is adapted to configure, when first preset duration starting from a first time point expires, the transceiver unit 1501 to transmit the signal by using at least the first beam, where the first time point is a time point at which the terminal sends an ACK message for the beam configuration information to the network device. For example, with reference to FIG. 4, FIG. 6, FIG. 8, and FIG. 10 to FIG. 12, the first time point may be an $(n+k1)^{th}$ slot. The first preset duration may be preset duration. The transceiver unit 1501 may be configured to perform step S202, S302, or S402.

In a possible design, the processing unit 1502 is specifically configured to: start a timer at the first time point, and configure, when a timing time of the timer reaches the first preset duration, the transceiver unit 1501 to transmit the signal by using at least the first beam. For example, with reference to FIG. 4, FIG. 6, FIG. 8, and FIG. 10 to FIG. 12, the timer may be a timer T1, and the transceiver unit 1501 may perform step S202. S302, or S402. The processing unit 1502 may perform step S203, S303, or S403 in combination with the transceiver unit 1501.

In a possible design, the processing unit 1502 is further configured to: stop the timer if the transceiver unit 1501 receives the beam configuration information again when the timer does not reach the first preset duration, and start the timer at a second time point, where the second time point is a time point at which the terminal sends an ACK message for the re-received beam configuration information to the network device. For example, with reference to FIG. 6, the second time point is an $(n+k1+n2+k1)^{th}$ slot. The processing unit 1502 may be configured to perform a step performed by the terminal other than transmission (including receiving and sending) in step S204c.

In a possible design, the processing unit 1502 is specifically adapted to configure, when the first preset duration starting from the first time point expires, the transceiver unit 1501 to transmit the signal by using a beam used last time or a beam used by default, in addition to the first beam. For example, with reference to FIG. 8 and FIG. 10 to FIG. 12, the processing unit 1502 may perform step S303 or S403 in combination with the transceiver unit 1501.

In a possible design, the processing unit 1502 is further adapted to configure, if the transceiver unit 1501 receives the signal on the first beam, the transceiver unit 1501 to receive a signal by using the first beam. For example, with reference to FIG. 8, the processing unit 1502 may perform step S305a in combination with the transceiver unit 1501.

In a possible design, the transceiver unit 1501 is further configured to send the ACK message for the beam configuration information to the network device if receiving the signal on a beam other than the first beam after the timing time of the timer reaches the first preset duration. The processing unit 1502 is further configured to: start the timer when the transceiver unit 1501 sends the ACK message, and configure, when the timing time of the timer reaches the first preset duration, the transceiver unit 1501 to receive a signal by using the first beam. For example, with reference to FIG. 10, the transceiver unit 1501 may be configured to perform a step of sending the ACK message in the manner 1. The processing unit 1502 may perform a step other than transmission in the manner 1.

In a possible design, the transceiver unit 1501 is further configured to send an error indication to the network device if receiving the signal on a beam other than the first beam, where the error indication is used to instruct the network device to resend the beam configuration information. For example, with reference to FIG. 11, the transceiver unit 1501 may be configured to perform a step of sending the error indication in the manner 2.

In a possible design, the processing unit 1502 is further adapted to configure, when second preset duration starting from a third time point expires, the transceiver unit 1501 to send a signal by using the first beam, where the third time point is a time point at which the timing time of the timer reaches the preset duration. For example, with reference to FIG. 12, the third time point may be an $(n+k1+r)^{th}$ slot, and the second preset duration is m2 slots. The processing unit 1502 may perform step S405 in combination with the transceiver unit 1501.

When the communications device 150 is applied to Embodiment 4:

The transceiver unit 1501 is configured to: receive beam configuration information sent by a network device, where the beam configuration information is used to instruct the terminal to transmit a signal by using a first beam; send an ACK message for the beam configuration information to the network device; and receive indication information that is sent by the network device and that indicates that the ACK message is successfully transmitted. The processing unit 1502 is adapted to configure, when preset duration starting from a fourth time point expires, the transceiver unit 1501 to transmit the signal by using the first beam, where the fourth time point is a time point at which the terminal receives the indication information. With reference to FIG. 13, the fourth time point is an $(n+k1+q)^{*h}$ slot. The transceiver unit 1501 may be configured to perform receiving and sending steps performed by the terminal in steps S502, S503, and S504a.

In a possible design, the processing unit 1502 is specifically configured to start a timer at the fourth time point, and configure, when a timing time of the timer reaches the preset duration, the transceiver unit 1501 to transmit the signal by using the first beam. With reference to FIG. 13, the timer is a timer T1. The processing unit 1502 may perform step S504a in combination with the transceiver unit 1501.

If the communications device 150 is a network device, the network device may be configured to perform a step performed by the network device in any one of Embodiment 1 to Embodiment 4.

When the communications device 150 is applied to Embodiment 1 to Embodiment 3:

The transceiver unit 1501 is configured to send beam configuration information to a terminal, where the beam configuration information is used to instruct the terminal to transmit a signal by using a first beam. The processing unit 1502 is adapted to configure, at a first time point, the transceiver unit 1501 to transmit the signal by using a second beam corresponding to the first beam, where the first time point is a time point at which the network device receives an ACK message that is for the beam configuration information and that is sent by the terminal. With reference to FIG. 4, FIG. 6, FIG. 8, and FIG. 10 to FIG. 12, the first time point may be an $(n+k1)^{th}$ slot. The transceiver unit 1501 may be configured to perform step S201. S301, or S401.

In a possible design, the processing unit 1502 is specifically configured to: start a timer at the first time point, and configure, when a timing time of the timer reaches preset duration, the transceiver unit 1501 to transmit the signal by using the second beam corresponding to the first beam. With reference to FIG. 4, FIG. 6, FIG. 8, and FIG. 10 to FIG. 12, the timer may be a timer T2. The processing unit 1502 may perform a step performed by the network device in step S204a or S204c, step S304a, a step performed by the network device in the manner 1 in FIG. 10, and step S404a in combination with the transceiver unit 1501.

In a possible design, the transceiver unit 1501 is further configured to: receive an error indication sent by the terminal, where the error indication is used to instruct the network device to resend the beam configuration information; and resend the beam configuration information to the terminal according to the error indication. With reference to FIG. 11, the transceiver unit 1501 may be configured to perform a step of receiving the error indication in the manner 2.

When the communications device 150 is applied to Embodiment 4.

The transceiver unit 1501 is configured to, send beam configuration information to a terminal, where the beam configuration information is used to instruct the terminal to transmit a signal by using a first beam; receive an ACK message that is for the beam configuration information and that is sent by the terminal; and send, to the terminal, indication information indicating that the ACK message is successfully transmitted. The processing unit 1502 is adapted to configure, when preset duration starting from a fourth time point expires, the transceiver unit 1501 to transmit the signal by using a second beam corresponding to the first beam. The fourth time point is a time point at which the network device sends the indication information. With reference to FIG. 13, the fourth time point is an $(n+k1+q)^{*h}$ slot. The transceiver unit 1501 is configured to perform receiving and sending steps performed by the network device in steps S501, S503, and S504a.

In a possible design, the processing unit 1502 is specifically configured to: start a timer at the fourth time point, and configure, when a timing time of the timer reaches the preset duration, the transceiver unit 1501 to transmit the signal by using the second beam corresponding to the first beam. With reference to FIG. 13, the processing unit 1502 may perform step S504a in combination with the transceiver unit 1501.

The communications device provided in this embodiment of this application may be configured to perform the foregoing beam configuration method. Therefore, for a technical effect that can be obtained by the communications device, refer to the foregoing method embodiments, and details are not described in this embodiment of this application again.

Figure 16:
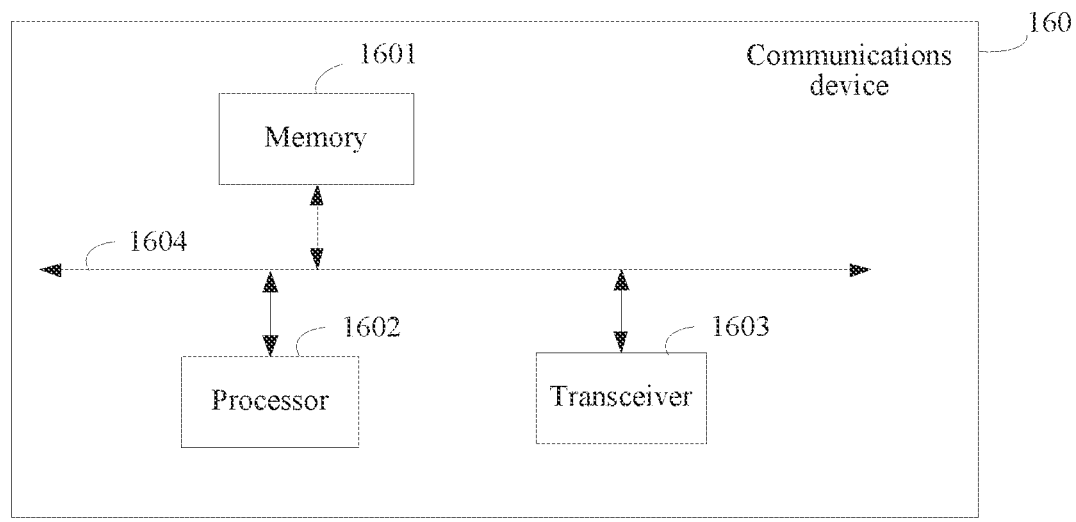
FIG. 16 is a second schematic structural diagram of a communications device according to an embodiment of this application.

For a hardware implementation of the communications device 150, refer to FIG. 16. As shown in FIG. 16, a communications device 160 may include a memory 1601, a processor 1602, a transceiver 1603, and a bus 1604. The memory 1601, the processor 1602, and the transceiver 1603 are connected to each other by using the bus 1604. The processing unit 1502 may be implemented by using the processor 1602. The transceiver unit 1501 may be implemented by using the transceiver 1603. The memory 1601 is configured to store a computer program.

When the communications device 150 is a terminal, when being executed by the processor 1602, the computer program stored in the memory 1601 enables the terminal to perform the steps performed by the terminal in Embodiment 1 to Embodiment 4. The transceiver 1603 is configured to communicate with another communications device (for example, a network device) under control of the processor 1602.

When the communications device 150 is a network device, when being executed by the processor 1602, the computer program stored in the memory 1601 enables the network device to perform the steps performed by the network device in Embodiment 1 to Embodiment 4. The transceiver 1603 is configured to communicate with another communications device (for example, a terminal) under control of the processor 1602.

The memory 1601 may be a storage chip or the like. The processor 1602 may be a CPU, a general-purpose processor, a digital signal processor (DSP), an application-specific integrated circuit (ASIC), a field programmable gate array (FPGA), another programmable logic device, a transistor logic device, a hardware component, or any combination thereof. The processor 1602 can implement or perform various examples of logic blocks, modules, and circuits described with reference to content disclosed in this application. The processor may alternatively be a combination implementing a computing function, for example, a combination including one or more microprocessors or a combination of a DSP and a microprocessor. The bus 1604 may be a Peripheral Component Interconnect (PCI) bus, an Extended Industry Standard Architecture (EISA) bus, or the like. The bus may be classified into an address bus, a data bus, a control bus, or the like. For ease of indication, the bus is indicated by using only one bold line in FIG. 16. However, it does not indicate that there is only one bus or only one type of bus.

In the beam configuration methods provided in Embodiment 1 to Embodiment 3 and the communications device embodiments provided in FIG. 15 and FIG. 16, the terminal transmits the signal by using at least the first beam when the first preset duration starting from the first time point expires. The first time point herein is specifically a $y^{th}$ slot. For example, in Embodiment 1 and Embodiment 3, the $y^{th}$ slot is specifically the $(n+k1)^{th}$ slot in which the terminal sends the ACK message to the network device. In Embodiment 2, the $y^{th}$ slot may be the $(n+k1+n2+k1)^{th}$ slot in which the terminal sends the ACK to the network device. Certainly, there is no direct relationship between the $y^{th}$ slot and the $n^{th}$ slot in which the network device sends the beam configuration information to the terminal, and the $y^{th}$ slot represents only a time point at which the terminal sends the ACK message to the network device. Optionally, the first time point may alternatively be a time point at which the network device sends the indication information to the terminal after receiving the ACK message fed back by the terminal and the terminal receives the indication information. For example, in Embodiment 4 shown in FIG. 13 and FIG. 14, the $y^{th}$ slot is specifically the $(n+k1+q)^{th}$ slot in which the terminal receives the indication information of the network device.

The network device transmits, when the preset duration starting from the first time point expires, the signal by using the second beam corresponding to the first beam. The first time point herein is specifically the $y^{th}$ slot, and the network device receives, in the $y^{th}$ slot, the ACK message sent by the terminal. For example, in Embodiment 1 and Embodiment 3, the $y^{th}$ slot is specifically the $(n+k1)^{th}$ slot in which the network device receives the ACK message fed back by the terminal. In Embodiment 2, the $y^{th}$ slot may be the $(n+k1+n2+k1)^{th}$ slot in which the network device receives the ACK message fed back by the terminal. Certainly, there is no direct relationship between the $y^{th}$ slot and the $n^{th}$ slot in which the network device sends the beam configuration information to the terminal, and the $y^{th}$ slot represents only a slot in which the network device receives the ACK message fed back by the terminal to the network device. After receiving the ACK message sent by the terminal, the network device sends the indication information to the terminal, to acknowledge that the network device has received the ACK message. In this case, the first time point may alternatively be a slot in which the terminal determines that the indication information sent by the network device is received. For example, in Embodiment 4 shown in FIG. 13 and FIG. 14, the $y^{th}$ slot is specifically the $(n+k1+q)^{th}$ slot.

To achieve behavior consistency between the network device and the terminal, the network device sends the beam configuration information to the terminal, and the beam configuration information is specifically used to configure, for the terminal, a beam used to transmit the signal. In a specific implementation, the network device may indicate a transmission configuration index (TCI) to the terminal by using a TCI bit, the TC bit corresponds to a TCI state, and the TCI state corresponds to a quasi co-location (QCL) relationship between one or more reference signals and a data channel reference signal. One TCI state corresponds to a beam for transmitting the signal. In this embodiment, signaling for sending the beam configuration information is referred to as activation signaling.

The terminal should apply the activation signaling under indication of the beam configuration information or the activation signaling of the network device after the first preset duration expires. Specifically, in a next slot after the first preset duration expires, the terminal enables a beam that is used to transmit the signal and that corresponds to a TCI state in the beam configuration information sent by the network device. When a signal is to be transmitted, the terminal transmits the signal by using the beam. For example, the terminal sends the signal by using a transmit beam, or receives the signal by using a receive beam.

An example in which it is ensured that the network device and the terminal have a same understanding on QCL of a PDCCH is used. For example, after a base station changes a TCI of a CORESET by using a MAC-CE activation signaling, the terminal should apply, at a time point, information indicated by the MAC-CE activation signaling, that is, adjust or switch, at the time point, to a receive beam indicated by the network device. Correspondingly, the network device should adjust a transmit beam at the same time point, to ensure beam alignment between the network device and the terminal. To ensure the beam alignment, after the first preset duration after the terminal makes a HARQ-ACK response to a PDSCH carrying the activation signaling, the terminal starts to apply a QCL assumption indicated by the activation signaling.

The method is applied to a plurality of other beam-related signals and channels, including the PDSCH/a PUCCH/a CSI-RS/an SRS, and is applied to an available TCI configuration of the PDSCH.

In addition, an available TCI of the PDSCH is used as an example. After receiving the beam configuration information sent by the network device to the terminal by using the PDSCH, the terminal sends a HARQ-ACK message to the network device. When the HARQ-ACK message is transmitted to the network device in a slot (y), the terminal starts to apply the activation signaling at a time point $slot(y)+3N_{slot}^{subframe,\mu}+1$, that is, starts to enable the beam that is used to transmit the signal and that is indicated in the beam configuration information sent by the network device, so that when a signal needs to be transmitted, the signal is transmitted by using the beam.

$3N_{slot}^{subframe,\mu}$ is the preset duration (for example, the foregoing first preset duration), N is a quantity of slots in one subframe, and a value of N is related to a system parameter $\mu$, as shown in the following Table 4 and Table 5.

TABLE 4

Quantity $N_{symb}^{slot}$ of OFDM symbols included in each slot of a normal cyclic prefix, quantity $N_{slot}^{frame,\mu}$ of slots included in each frame, and quantity $N_{slot}^{subframe,\mu}$ of slots included in each subframe

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |

TABLE 4-continued

Quantity $N_{symb}^{slot}$ of OFDM symbols included in each slot of a normal cyclic prefix, quantity $N_{slot}^{frame, \mu}$ of slots included in each frame, and quantity $N_{slot}^{subframe, \mu}$ of slots included in each subframe

| $\mu$ | $N_{symb}^{slot}$ | $N_{slot}^{frame, \mu}$ | $N_{slot}^{subframe, \mu}$ |
|---|---|---|---|
| 2 | 14 | 40 | 4 |
| 3 | 14 | 80 | 8 |
| 4 | 14 | 160 | 16 |

TABLE 5

Quantity $N_{symb}^{slot}$ of OFDM symbols included in each slot of an extended cyclic prefix, quantity $N_{slot}^{frame, \mu}$ of slots included in each frame, and quantity $N_{slot}^{subframe, \mu}$ of slots included in each subframe

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

$\mu$ is an identifier of a system parameter, and a value of $\mu$ is shown in the following Table 6.

TABLE 6

Supported transmission type

| $\mu$ | Subcarrier spacing ($\Delta f = 2^{\mu} \cdot 15$ [kHz]) | Cyclic prefix |
|---|---|---|
| 0 | 15 | Normal |
| 1 | 30 | Normal |
| 2 | 60 | Normal Extended |
| 3 | 120 | Normal |
| 4 | 240 | Normal |

Figure 17:
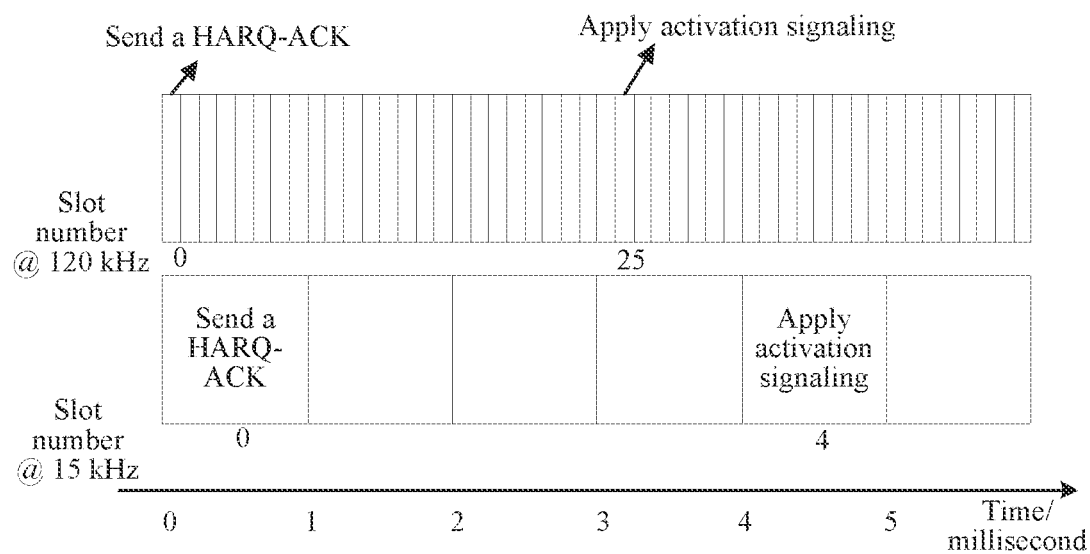
FIG. 17 is a schematic diagram of a beam configuration procedure.

An uplink slot and a downlink slot may have different unit lengths. The PDCCH is used as an example. A subcarrier spacing (SCS) of uplink transmission may be different from that of downlink transmission. For example, as shown in FIG. 17, an SCS of 15 kHz is used for the uplink transmission, and a length of one uplink slot is 1 millisecond; and an SCS of 120 kHz is used for the downlink transmission, and a length of one downlink slot is 0.125 millisecond. It may be learned with reference to Table 6 that the SCS of 15 kHz is used for the uplink transmission, in other words, $\Delta f$ is 15 kHz, and a system parameter $\mu$ corresponding to $\Delta f$ is 0; and the SCS of 120 kHz is used for the downlink transmission, in other words, $\Delta f$ is 120 kHz. and a system parameter $\mu$ corresponding to $\Delta f$ is 3. Therefore, the uplink transmission and the downlink transmission correspond to different system parameters, and the uplink slot and the downlink slot have different unit lengths. Consequently, the network device and the terminal have different understandings on a slot corresponding to the first time point at which the ACK message is sent and a slot in which the activation signaling is applied. For example, the terminal sends the ACK message in the $0^{th}$ uplink slot, and applies the activation signaling in the fourth uplink slot after 3 milliseconds, in other words, after three uplink slots. For the network device, 3 milliseconds are equivalent to 24 downlink slots, that is, the network device applies the activation signaling in the $25^{th}$ downlink slot after 24 downlink slots.

Therefore, for the slot corresponding to the first time point and the slot corresponding to a time point at which the activation signaling is applied after the first preset duration expires, the network device and the terminal respectively use the downlink slot and the uplink slot as a timing criterion. Consequently, the network device and the terminal have inconsistent understandings on the time point (slot) at which the activation signaling is applied.

To achieve understanding consistency between the network device and the terminal on the time point corresponding to application of the activation signaling, in this embodiment of this application, there are the following several manners of determining the slot corresponding to the first time point, in other words, the $y^{th}$ slot described above or the slot (y):

Manner 1: The first time point, namely, the $y^{th}$ slot, is an uplink slot (y), that is, the terminal determines, based on a system parameter of an uplink carrier component (CC), an uplink bandwidth part (BWP), or an uplink frame, the time point at which the activation signaling is applied.

Figure 18:
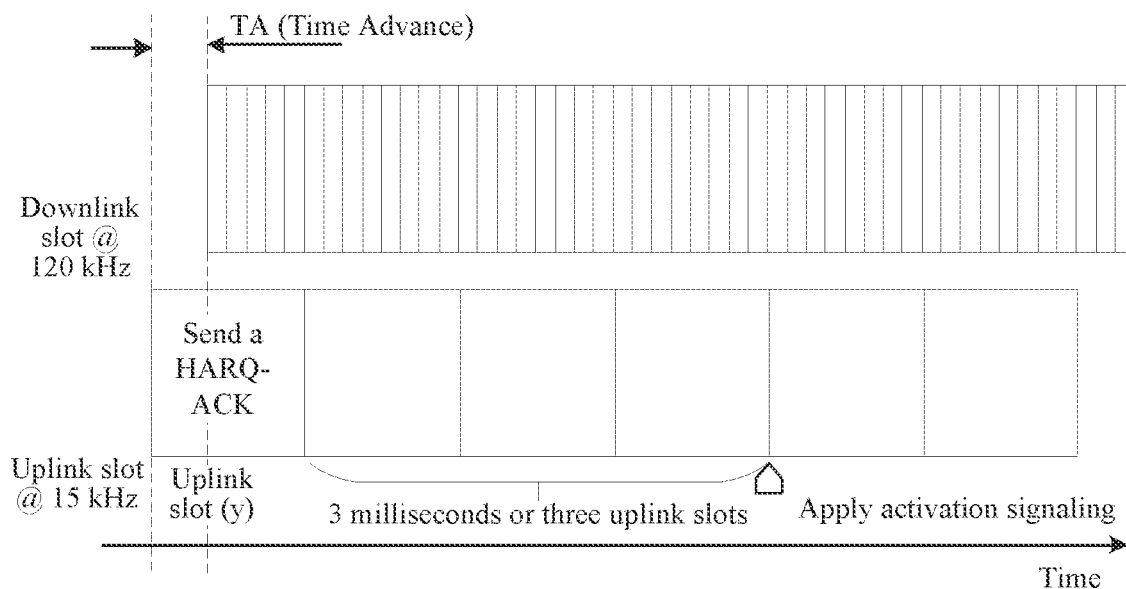
FIG. 18 is another schematic diagram of a beam configuration procedure according to an embodiment of this application.

Specifically, as shown in FIG. 18, the first time point is an uplink slot (y) in which the terminal sends the acknowledgement (ACK) message for the beam configuration information to the network device. The terminal starts the timer in the uplink slot (y). The first preset duration is a length of the timer. The first preset duration is x milliseconds, and may be specifically 3 milliseconds; or is m uplink slots, where m is a positive integer. For example, as shown in Table 6, when one uplink slot has a subcarrier spacing of 15 kHz and has a length of 1 millisecond, the length of the timer, namely, the first preset duration, may be three uplink slots.

Alternatively, a slot in which the terminal transmits the signal by using the first beam is set to slot(y)+ $3N_{slot}^{subframe,\mu}$+1. slot (y) indicates an uplink slot (y) and is the first time point. $3N_{slot}^{subframe,\mu}$ is the first preset duration, and 1 indicates a next slot after the first preset duration expires. slot(y)+$3N_{slot}^{subframe,\mu}$+1 indicates that the terminal starts the timer in the uplink slot(y) in which the terminal sends the ACK message to the network device, and starts applying the activation signaling in the next uplink slot after the first preset duration $3N_{slot}^{subframe,\mu}$. N is a quantity of slots in one subframe. $\mu$ is equal to a system parameter $\mu_{UL}$ of an uplink carrier component, an uplink bandwidth part, or an uplink frame that is used to send the acknowledgement ACK. For example, the first preset duration $3N_{slot}^{subframe,\mu}$ is equal to 3 milliseconds. Alternatively, as shown in Table 4 and Table 6, when one uplink slot has a subcarrier spacing of 15 kHz and the quantity of slots in one subframe is 1, the first preset duration $3N_{slot}^{subframe,\mu}$ is equal to three uplink slots. The signal is transmitted by using the first beam in the next uplink slot after the first preset duration expires, in other words, after 3 milliseconds or three uplink slots. Transmitting the signal by using the first beam in this specification is applying the activation signaling, enabling the first beam indicated in the beam configuration information corresponding to the activation signaling, and when a signal needs to be transmitted, transmitting the signal by using the first beam.

Correspondingly, the network device determines, in the same manner, the slot corresponding to the first time point and the time point at which the activation signaling is applied.

Manner 2: The first time point, namely, the $y^{th}$ slot, is a downlink slot (y), that is, the terminal determines, based on a configuration of a system parameter of a downlink CC, a downlink BWP, or a downlink frame, the slot in which the activation signaling is applied.

Figure 19:
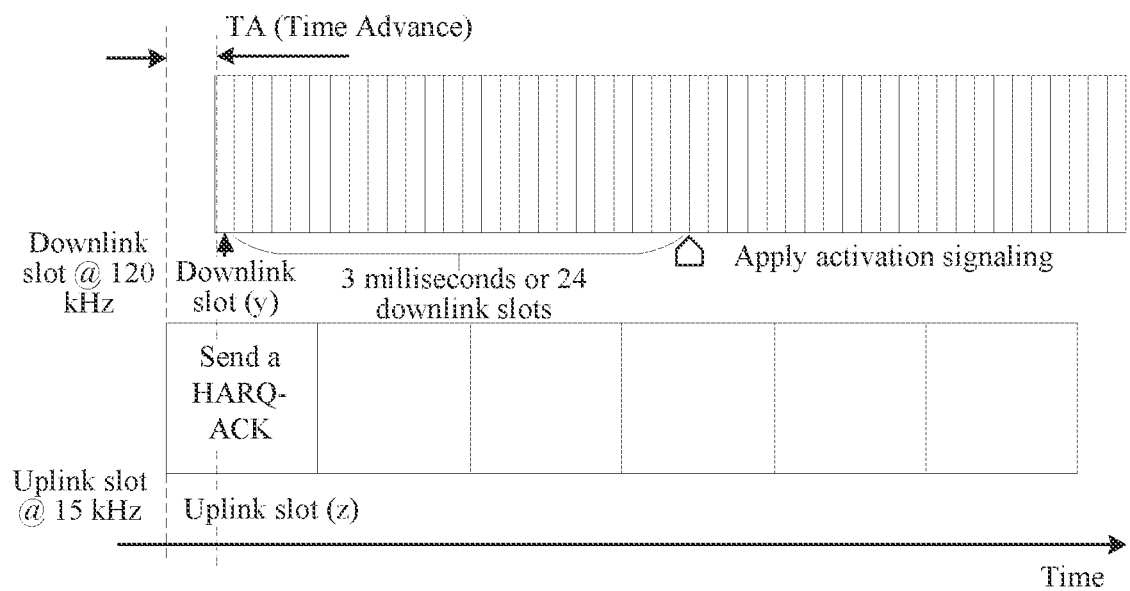
FIG. 19 is still another schematic diagram of a beam configuration procedure according to an embodiment of this application.

Specifically, as shown in FIG. 19, the first time point is a downlink slot (y) corresponding to an uplink slot (z) in which the terminal sends the acknowledgement (ACK) message for the beam configuration information to the network device. The terminal starts the timer in the downlink slot (y). The first preset duration is a length of the timer. The first preset duration is x milliseconds, and may be specifically 3 milliseconds; or is m downlink slots, where m is a positive integer. For example, as shown in Table 6, when one downlink slot has a subcarrier spacing of 120 kHz and a length of one downlink slot is 0.125 millisecond, the length of the timer, namely, the first preset duration, may be 24 downlink slots.

A method for converting the uplink slot (z) into the downlink slot (y) may be slot(y)=slot($\lfloor z*(2^{\mu_{DL}}/2^{\mu_{UL}}) \rfloor$). $\lfloor \: \rfloor$ is a rounding down symbol. $\mu_{UL}$ and $\mu_{DL}$ are respectively system parameters used for uplink transmission and downlink transmission.

Alternatively, a slot in which the terminal transmits the signal by using the first beam is set to slot(y)+$3N_{slot}^{subframe,\mu}$+1.

$$\text{slot }(y) = \text{slot}\left(z \left\lfloor \frac{2^{\mu_{DL}}}{2^{\mu_{UL}}} \right\rfloor\right)$$

indicates a downlink slot (y) and is the first time point. z is a number of an uplink slot (z) in which the terminal sends the acknowledgement (ACK) message for the beam configuration information to the network device. $\mu_{DL}$ is a system parameter of a downlink carrier component, a downlink bandwidth part, or a downlink frame that is used by the terminal to receive a physical downlink shared channel. $\mu_{UL}$ is a system parameter of an uplink carrier component, an uplink bandwidth part, or an uplink frame that is used by the terminal to send the acknowledgement (ACK) message to the network device.

$$\left\lfloor z \frac{2^{\mu_{DL}}}{2^{\mu_{UL}}} \right\rfloor$$

indicates rounding down a result of $$z \frac{2^{\mu_{DL}}}{2^{\mu_{UL}}}.$$

$3N_{slot}^{subframe,\mu}$ is the first preset duration, and 1 indicates a next slot after the first preset duration expires. slot(y)+$3N_{slot}^{subframe,\mu}$+1 indicates that the terminal starts the timer in the downlink slot(y) in which the terminal sends the ACK message to the network device, and starts applying the activation signaling in the next downlink slot after the first preset duration $3N_{slot}^{subframe,\mu}$. N is a quantity of slots in one subframe, and $\mu$ is the system parameter $\mu_{DL}$ of the downlink carrier component, the downlink bandwidth part, or the downlink frame that is used by the terminal to receive the physical downlink shared channel. For example, the first preset duration $3N_{slot}^{subframe,\mu}$ is equal to 3 milliseconds. Alternatively, as shown in Table 4 and Table 6, when one downlink slot has a subcarrier spacing of 120 kHz and the quantity of slots in one subframe is 8, the first preset duration $3N_{slot}^{subframe,\mu}$ is 24 downlink slots. Therefore, the signal is transmitted by using the first beam in the next downlink slot after the first preset duration expires, that is, after 3 milliseconds or 24 downlink slots. Transmitting the signal by using the first beam in this specification is applying the activation signaling, enabling the first beam indicated in the beam configuration information corresponding to the activation signaling, and when a signal needs to be transmitted, transmitting the signal by using the first beam.

Optionally, compared with the downlink frame, the uplink frame has a time advance (TA) in terms of a sending time. Therefore, when the time point at which the activation signaling is applied is determined by using the downlink system parameter configuration, impact of the TA needs to be considered. As shown in FIG. 19, the first preset duration is equivalent to TA+m milliseconds.

Correspondingly, the network device determines, in the same manner, the slot corresponding to the first time point and the slot in which the activation signaling is applied.

Manner 3: The terminal compares an uplink system parameter and a downlink system parameter, and determines one of the uplink system parameter and the downlink system parameter as a basis of time unification. For example, the terminal compares system parameters P of carrier components, bandwidth parts, or uplink and downlink frames, and uses a system parameter corresponding to the smaller one of an uplink subcarrier spacing and a downlink subcarrier spacing as a range of time measurement and as a basis of determining the first time point and the first preset duration, in other words, determining the time point at which the activation signaling is applied.

Specifically, the terminal starts the timer in a slot (v) in which the terminal sends the ACK message to the network device. The slot (y) is a slot (y) corresponding to a system parameter $\mu$ of a carrier component, a bandwidth part, or an uplink/downlink frame that corresponds to the smaller one of the uplink subcarrier spacing and the downlink subcarrier spacing, for example, may be an uplink slot (y) or a downlink slot (y).

Alternatively, a slot in which the terminal transmits the signal by using the first beam is set to slot(y)+$3N_{slot}^{subframe,\mu}$+1. $\mu$ is the smaller one of $\mu_{DL}$ and $\mu_{UL}$, $\mu_{UL}$ is a system parameter of an uplink carrier component, an uplink bandwidth part, or an uplink frame that is used when the terminal sends the acknowledgement (ACK) message, and $\mu_{DL}$ is a system parameter of a downlink carrier component, a downlink bandwidth part, or a downlink frame that is used by the terminal to receive a physical downlink shared channel. As shown in Table 6, assuming that a subcarrier spacing corresponding to the uplink carrier component, the uplink bandwidth part, or the uplink frame is 15 kHz, corresponding $\mu UL$ is 0; and assuming that a subcarrier spacing corresponding to the downlink carrier component, the downlink bandwidth part, or the downlink frame is 120 kHz, corresponding $\mu_{DL}$ is 3. Therefore, when a time point at which the terminal transmits the signal by using the first beam is determined by using slot(y)+$3N_{slot}^{subframe,\mu}$+1, $\mu$ is the smaller value $\mu_{UL}$ in $\mu_{DL}$ and $\mu_{UL}$, and slot(y) is the uplink slot (y) corresponding to $\mu_{UL}$.

Correspondingly, the network device determines, in the same manner, the slot corresponding to the first time point and the slot in which the activation signaling is applied.

In the foregoing three manners, the system parameter $\mu_{UL}$ of the uplink CC, the uplink BWP, or the uplink frame may be an uplink system parameter $\mu_{HARQ-ACK}$ applied at the time point at which the terminal sends the ACK message, or may be an uplink system parameter $\mu_{PUSCH}$ applied at a time point at which the terminal sends a PUSCH. The PUSCH is a channel occupied by the terminal to send the ACK message to the network device. Alternatively, the uplink system parameter $\mu_{UL}$ may be an uplink system parameter $\mu_{PUCCH}$ applied at a time point at which the terminal sends a PUCCH. The PUCCH is a channel occupied by the terminal to send the ACK message to the network device. Alternatively, $\mu_{PUCCH}$ may be an uplink system parameter $\mu_{PUCCH}$ corresponding to a PUCCH for scheduling a PUSCH.

The system parameter $\mu_{DL}$ of the downlink CC, the downlink BWP, or the downlink frame may be a downlink system parameter $\mu_{PDSCH}$ applied at a time point at which the terminal receives a PDSCH, or may be a downlink system parameter $\mu_{HARQ-ACK}$ applied at the time point at which the terminal sends the ACK message. The PDSCH is a channel occupied by the activation signaling sent by the network device to the terminal. Alternatively, the downlink system parameter $\mu_{DL}$ may be a downlink system parameter $\mu_{PDCCH}$ applied at a time point at which the terminal receives a PDCCH. The PDCCH is a PDCCH for scheduling a PDSCH by the terminal, and the downlink system parameter $\mu_{PDCCH}$ is a downlink system parameter $\mu_{PDCCH}$ for scheduling the PDSCH.

In Embodiment 1 to Embodiment 3, the first time point is a slot in which the terminal sends the ACK message to the network device. When the terminal sends the ACK for a plurality of times, the first time point is an uplink slot in which the terminal sends the acknowledgement (ACK) message for the beam configuration information to the network device for the first time or the last time, or is a downlink slot corresponding to an uplink slot (z) in which the network device receives, for the first time or the last time, the acknowledgement (ACK) message that is for the beam configuration information and that is sent by the terminal.

Figure 20:
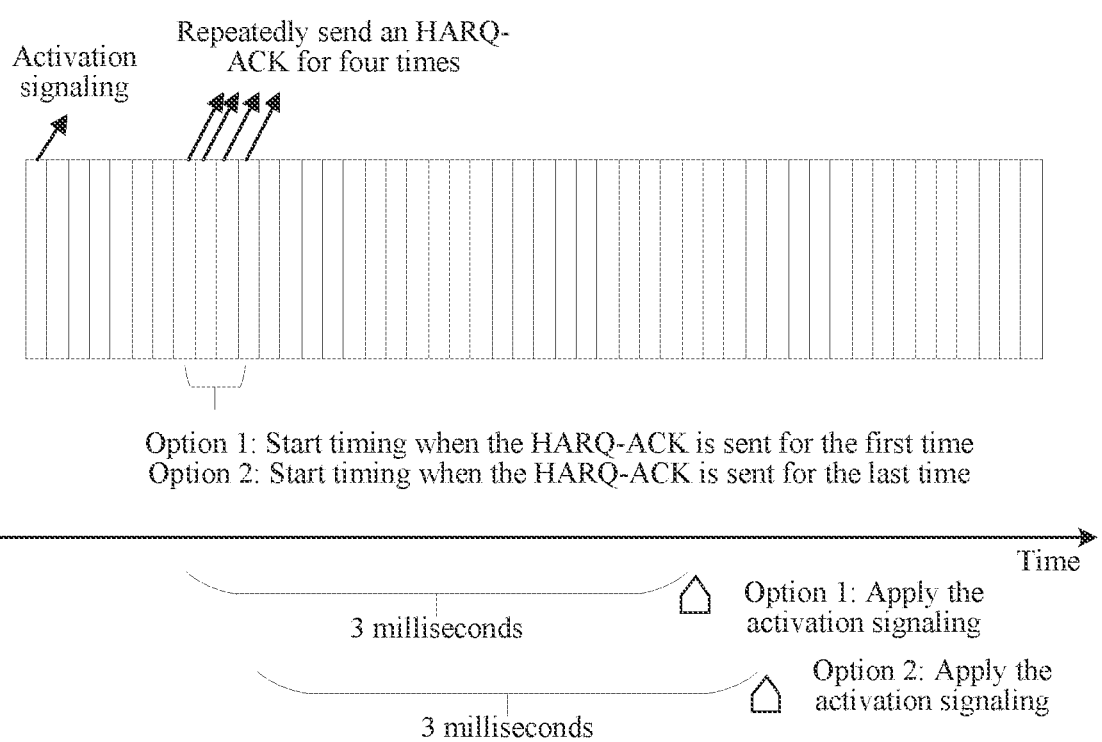
FIG. 20 is yet another schematic diagram of a beam configuration procedure according to an embodiment of this application.

As shown in FIG. 20, the terminal sends the ACK message to the network device for four times in total. In one manner, the terminal uses a slot in which the terminal sends the ACK message to the network device for the first time as the first time point, starts the timer to start timing, and starts applying the activation signaling after the first preset duration expires, for example, after 3 milliseconds. In the other manner, the terminal uses a time point at which the terminal sends the ACK message to the network device for the last time as the first time point, that is, uses a time point at which the terminal sends the ACK message to the network device for the fourth time as the first time point, starts the timer to start timing, and starts applying the activation signaling after the first preset duration expires, for example, after 3 milliseconds.

Optionally, the first time point may alternatively be a time point at which the terminal starts the timer when the terminal receives the indication information returned by the network device to the terminal to confirm that the network device has received the ACK message. For example, in Embodiment 4 shown in FIG. 12 to FIG. 13, the $y^{th}$ slot is specifically the $(n+k1+q)^{th}$ slot.

Correspondingly, the network device determines, in the same manner, the slot corresponding to the first time point and the slot in which the activation signaling is applied.

It should be noted that in all the embodiments of this application, the ACK message sent or fed back by the terminal to the network device may be a hybrid automatic repeat request-acknowledgement (HARQ-ACK).

Figure 21:
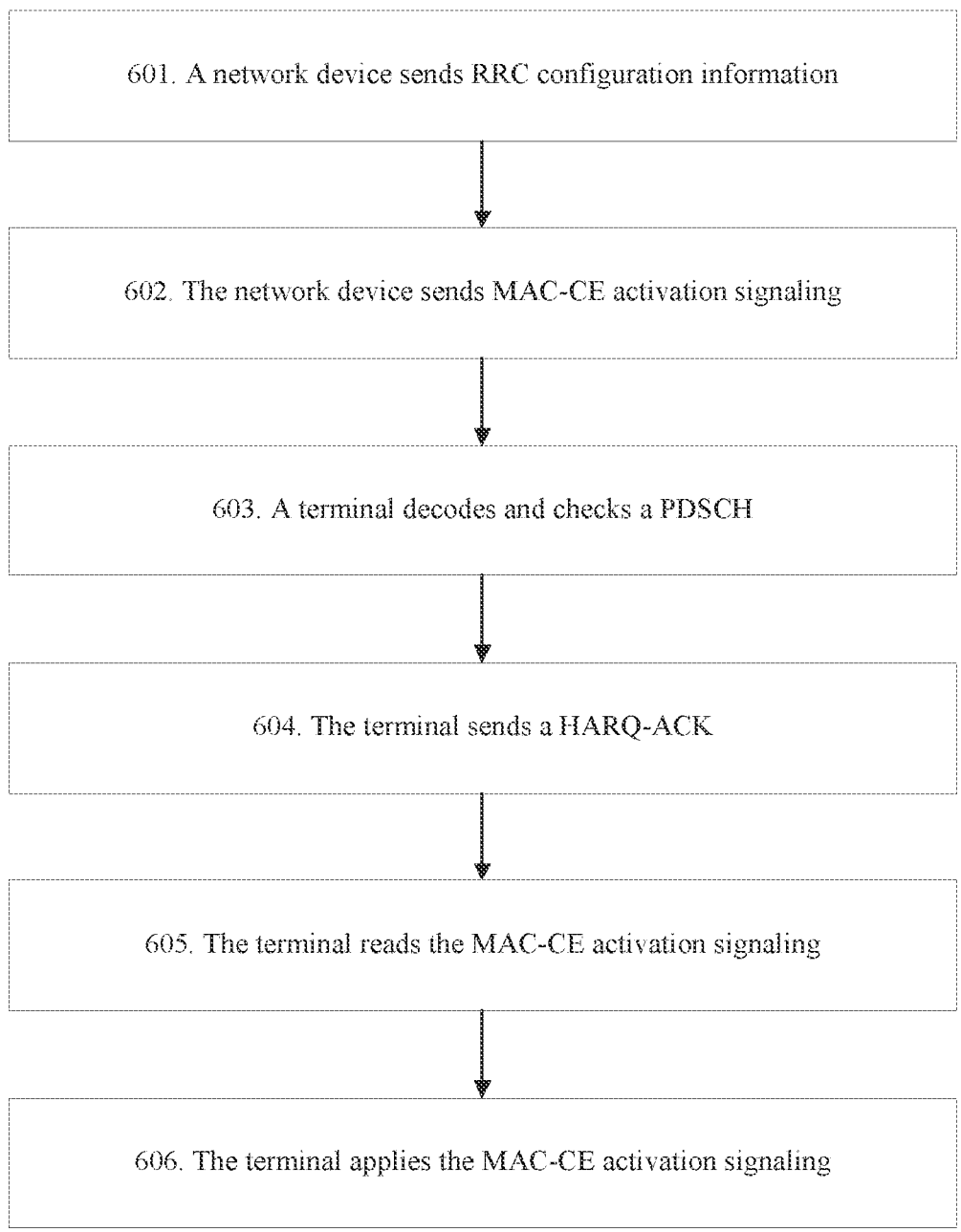
FIG. 21 is an interaction flowchart of a beam configuration procedure according to an embodiment of this application.

Therefore, the network device and the terminal can determine, based on a same principle, the slot corresponding to the first time point and the slot in which the activation signaling is applied. In this embodiment of this application, a complete procedure from a step of sending beam configuration information to the terminal by the network device to a step of applying the beam configuration information by the terminal is shown in FIG. 21 and is as follows:

Step 601: The network device sends RRC configuration information to the terminal.

An RRC configuration in this embodiment of this application mainly refers to beams, QCL relationships, or spatial relations of various physical channels or signals, and includes: a control resource set (CORESET) configuration: for each CORESET, a plurality of possible beams are configured for the terminal by adding and releasing a transmission configuration index state (TCI State);

a physical uplink control channel (PUCCH) configuration: for all PUCCH resources, a plurality of possible beams are configured for the terminal by adding and releasing PUCCH spatial relation information (PUCCH-SpatialRelationInfo);

a channel state information-reference signal (CSI-RS) configuration: for all CSI-RS resources, a plurality of possible beams are configured for the terminal by adding and releasing a transmission configuration index state (TCI State); and a physical downlink shared channel (PDSCH) TCI configuration: for a PDSCH, a plurality of possible beams are configured for the terminal by adding and releasing a transmission configuration index state (TCI State).

The RRC configuration is usually sent by using a PDSCH, and may be divided into one or more TBs based on a size of the configuration information, to be sent to the terminal in one or more slots.

Step 602: The network device sends Media Access Control control element (MAC-CE) activation signaling to the terminal.

The MAC-CE activation signaling in this embodiment of this application is signaling used by the network device to select, for the terminal for various physical channels/signals, a particular beam, QCL relationship, or spatial relation from the plurality of possible beams. QCL relationships, or spatial relations that are configured in step 601.

Figure 22:
FIG. 22 is a schematic signaling diagram of a beam configuration solution according to an embodiment of this application.

For example, as shown in FIG. 22, for TCI activation signaling of the CORESET, a particular TCI is designated for a particular CORESET by using the MAC-CE activation signaling. Optionally, when CORESET ID=0, if the first bit of a TCI state ID is a first value, for example, 1, the last six bits of the TCI state ID represent a TCI state, or if the first bit of a TCI state ID is a second value, for example, 0, the last six bits of the TCI state ID represent an SSB index.

Figure 23:
FIG. 23 is another schematic signaling diagram of a beam configuration solution according to an embodiment of this application.

For example, as shown in FIG. 23, for spatial relation activation signaling of the PUCCH, a particular spatial relation is designated for a particular PUCCH by using the MAC-CE activation signaling. St being 1 indicates that a spatial relation whose PUCCH-SpatialRelationInfoID is i is activated, and Si being 0 indicates that a spatial relation whose PUCCH-SpatialRelationInfoID is i is not activated.

Figure 24:
FIG. 24 is still another schematic signaling diagram of a beam configuration method according to an embodiment of this application.

For example, as shown in FIG. 24, TCI activation signaling of the CSI-RS is particularly for a semi-persistent (SP) CSI-RS. The CSI-RS is activated in one set. Therefore, a particular TCI needs to be designated for a particular CSI-RS resource set. If there are a plurality of CSI-RS resources in a set, a particular TCI needs to be designated for each CSI-RS resource.

Figure 25:
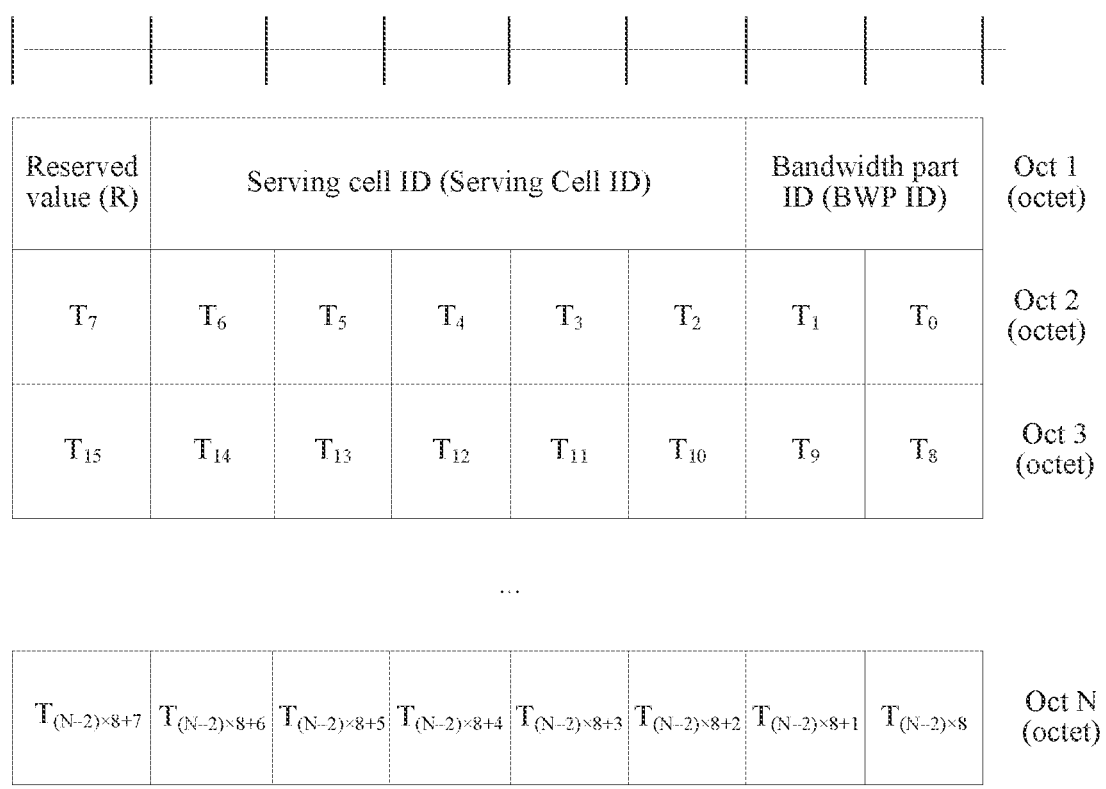
FIG. 25 is yet another schematic signaling diagram of a beam configuration procedure according to an embodiment of this application.

For example, as shown in FIG. 25, for selection signaling of a PDSCH TCI, at most eight TCI states are selected for the PDSCH by using the MAC-CE activation signaling. T1 being 1 indicates that a TCI state whose TCI-StateID is i is activated. T1 being 0 indicates that a TCI state whose TCI-StateID is i is not activated.

For example, as shown in FIG. 26, spatial relation activation signaling of an SRS is particularly for a semi-persistent (SP) SRS. A difference from the foregoing is that a spatial relation is directly indicated for the SP SRS by using the MAC-CE activation signaling without a step of configuring a plurality of possible spatial relations by using RRC. Activation is performed in one set. Therefore, a particular spatial relation needs to be designated for a particular SRS resource set. If there are a plurality of SRS resources in a set, a particular spatial relation needs to be indicated for each SRS resource. $F_i$+Resource $ID_i$ of eight bits in total is used as a spatial relation indication of an $i^{th}$ SRS resource. If $F_i=1$, Resource $ID_i$ is a CSI-RS resource ID. If $F_i=0$, and the first bit of Resource $ID_i$ is 1, remaining six bits are an SSB index. If $F_i=0$, and the first bit of Resource $ID_i$ is 0, remaining six bits are an SRS resource ID. In FIG. 26, C is used to indicate whether a byte including Resource Serving Cell ID field(s) and Resource BWP ID field(s) exists. SUL is used to indicate whether the signaling is applied to a supplementary uplink carrier.

The MAC-CE activation signaling is usually sent by using a PDSCH, and may be divided into one or more TBs based on a size of the signaling, to be sent in one or more slots.

Step 603: The terminal receives and decodes a PDSCH to obtain a TB, and performs CRC check to determine whether the RRC configuration signaling and the MAC-CE activation signaling are correctly received.

Step 604: If the CRC check in step 603 succeeds, the terminal prepares to feed back an ACK for the PDSCH. Correspondingly, the network device receives the ACK message fed back by the terminal.

In this step, the terminal and the network device determine a first time point and first preset duration according to any method in Embodiment 1 to Embodiment 4, and start timers at the first time point, and therefore determine a time point at which the MAC-CE activation signaling is applied.

Step 605: The terminal reads specific content of the MAC-CE activation signaling from a bit sequence.

Step 606: The terminal applies the MAC-CE activation signaling. Specifically, when the timers that start being used in step 604 expire, the terminal starts applying the content of the MAC-CE activation signaling, including:

starting using a transmission configuration index (TCI) that is designated for a control resource set CORESET by using the Media Access Control control element (MAC-CE) activation signaling, to determine a quasi co-location (QCL) assumption of the control resource set CORESET; or starting using a spatial relation that is designated for a physical uplink control channel PUCCH by using the MAC-CE activation signaling, to send the PUCCH; or starting receiving a semi-persistent channel state information reference signal resource set according to an indication of the MAC-CE activation signaling, and receiving a semi-persistent channel state information reference signal resource in the semi-persistent channel state information reference signal resource set by using a TCI; or starting obtaining a TCI indication of a physical downlink shared channel PDSCH and a TCI state of the RRC configuration through mapping from downlink control information DCI according to an indication of the MAC-CE activation signaling; or starting sending a semi-persistent channel state information reference signal resource set according to an indication of the MAC-CE activation signaling, and sending a channel sounding reference signal resource in the semi-persistent channel state information reference signal resource set by using a transmit beam.

Correspondingly, the network device also starts sending the CORESET/PDSCH/SP CSI-RS and receiving the PUCCH/SRS by using a beam indicated by the network device.

Implementation of the embodiments of this application can avoid a problem that a mismatch may be caused between a transmit end and a receive end in terms of a validation time of the beam configuration information. The network device starts the timer when receiving the ACK message of the terminal, and transmits, when the timing time of the timer reaches the preset duration, the signal by using the second beam corresponding to the first beam. Timer starting and the preset duration are both based on an uplink slot or a downlink slot, and the timers are both started when the terminal sends the ACK message for the first time or the last time. Therefore, when the terminal sends the ACK message and the network device receives the ACK message, behavior consistency between the network device and the terminal is facilitated, thereby improving signal transmission efficiency.

The methods or algorithm steps described with reference to the content disclosed in this application may be implemented by hardware, or may be implemented by executing a software instruction by a processing module. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or a storage medium in any other forms well-known in the art. A storage medium used as an example is coupled to a processor, so that the processor can read information from the storage medium, and can write information into the storage medium. Certainly, the storage medium may be a component of the processor. The processor and the storage medium may be located in an ASIC.

A person skilled in the art should be aware that in one or more of the foregoing examples, the functions described in this application may be implemented by hardware, software, firmware, or any combination thereof. When being implemented by software, these functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general-purpose or dedicated computer.

The objectives, technical solutions, and beneficial effects of this application are further described in detail in the foregoing specific implementations. It should be understood that the foregoing descriptions are merely specific implementations of this application and are not intended to limit the protection scope of this application.

What is claimed is:

1. A beam configuration method, comprising:
receiving beam configuration information from a network device, wherein the beam configuration information indicates a terminal device to transmit or receive a signal by using a first beam; and
transmitting or receiving the signal by using at least the first beam after a first preset duration starting from a first time-domain unit, wherein the first time-domain unit is an uplink slot in which an acknowledgement (ACK) message for the beam configuration information is transmitted to the network device, and wherein the first preset duration is determined based on quantity of slots in a subframe and the quantity of slots in the subframe is related to a system parameter of an uplink bandwidth part or an uplink frame, that is used for ACK message transmission.

2. The beam configuration method according to claim 1, wherein the first preset duration is $3N_{slot}^{subframe,\mu}$, $N_{slot}^{subframe,\mu}$ is the quantity of slots in the subframe, and $\mu$ is the system parameter.

3. The beam configuration method according to claim 2, wherein a time-domain unit in which the signal is transmitted or received by using at least the first beam is slot(y)+$3N_{slot}^{subframe,\mu}$+1, wherein slot(y) indicates the uplink slot.

4. The beam configuration method according to claim 1, wherein the signal comprises downlink control channel information, uplink control channel information, or uplink sounding signal.

5. The beam configuration method according to claim 1, wherein the beam configuration information configures the first beam for the terminal device by indicating a transmission configuration index (TCI) by using a TCI bit, wherein the TCI bit corresponds to a TCI state, wherein the TCI state corresponds to a quasi co-location (QCL) relationship between one or more reference signals and a data channel reference signal, wherein the QCL relationship comprises frequency resource information, and wherein the frequency resource information comprises a carrier number or a bandwidth part number.

6. The beam configuration method according to claim 5, wherein when no TCI state is indicated, the first beam is a default beam.

7. A processing apparatus, comprising at least one processor and a non-transitory memory coupled to the at least one processor and storing programming instructions for execution by the at least one processor to perform operations comprising:
   receiving beam configuration information from a network device, wherein the beam configuration information indicates a terminal device to transmit or receive a signal by using a first beam; and
   transmitting or receiving the signal by using at least the first beam after a first preset duration starting from a first time-domain unit, wherein the first time-domain unit is an uplink slot in which an acknowledgement (ACK) message for the beam configuration information is transmitted to the network device, and wherein the first preset duration is determined based on quantity of slots in a subframe and the quantity of slots in the subframe is related to a system parameter of an uplink bandwidth part or an uplink frame, that is used for ACK message transmission.

8. The processing apparatus according to claim 7, wherein the first preset duration is $3N_{slot}^{subframe,\mu}$, $N_{slot}^{subframe,\mu}$ is the quantity of slots in the subframe, and $\mu$ is the system parameter.

9. The processing apparatus according to claim 8, wherein a time-domain unit in which the signal is transmitted or received by using at least the first beam is slot(y)+$3N_{slot}^{subframe,\mu}$+1, wherein slot(y) indicates the uplink slot.

10. The processing apparatus according to claim 7, wherein the signal comprises downlink control channel information, uplink control channel information, or uplink sounding signal.

11. The processing apparatus according to claim 7, wherein the beam configuration information configures the first beam for the terminal device by indicating a transmission configuration index (TCI) by using a TCI bit, wherein the TCI bit corresponds to a TCI state, wherein the TCI state corresponds to a quasi co-location (QCL) relationship between one or more reference signals and a data channel reference signal, wherein the QCL relationship comprises frequency resource information, and wherein the frequency resource information comprises a carrier number or a bandwidth part number.

12. The processing apparatus according to claim 11, wherein when no TCI state is indicated, the first beam is a default beam.

13. The processing apparatus according to claim 7, wherein the processing apparatus is the terminal device.

14. A beam configuration method, comprising:
   transmitting beam configuration information to a terminal device, wherein the beam configuration information indicates the terminal device to transmit or receive a signal by using a first beam; and
   transmitting or receiving the signal by using a second beam corresponding to at least the first beam, after a first preset duration starting from a first time-domain unit, wherein the first time-domain unit is an uplink slot in which an acknowledgement (ACK) message for the beam configuration information is received from the terminal device, and wherein the first preset duration is determined based on quantity of slots in a subframe and the quantity of slots in the subframe is related to a system parameter of an uplink bandwidth part or an uplink frame, that is used for ACK message transmission.

15. The beam configuration method according to claim 14, wherein the first preset duration is $3N_{slot}^{subframe,\mu}$, $N_{slot}^{subframe,\mu}$ is the quantity of slots in the subframe, and $\mu$ is the system parameter.

16. The beam configuration method according to claim 15, wherein a time-domain unit in which the signal is transmitted or received by using the second beam corresponding to at least the first beam is slot(y)+$3N_{slot}^{subframe,\mu}$+1, wherein slot(y) indicates the uplink slot.

17. The beam configuration method according to claim 14, wherein the signal comprises downlink control channel information, uplink control channel information, or uplink sounding signal.

18. The beam configuration method according to claim 14, wherein the beam configuration information configures the first beam for the terminal device by indicating a transmission configuration index (TCI) by using a TCI bit, wherein the TCI bit corresponds to a TCI state, wherein the TCI state corresponds to a quasi co-location (QCL) relationship between one or more reference signals and a data channel reference signal, wherein the QCL relationship comprises frequency resource information, and wherein the frequency resource information comprises a carrier number or a bandwidth part number.

19. The beam configuration method according to claim 18, wherein when no TCI state is indicated, the first beam is a default beam.

20. A processing apparatus, comprising at least one processor and a non-transitory memory coupled to the at least one processor and storing programming instructions for execution by the at least one processor to perform operations comprising:
   transmitting beam configuration information to a terminal device, wherein the beam configuration information indicates the terminal device to transmit or receive a signal by using a first beam; and transmitting or receiving the signal by using a second beam corresponding to at least the first beam, after a first preset duration starting from a first time-domain unit, wherein the first time-domain unit is an uplink slot in which an acknowledgement (ACK) message for the beam configuration information is received from the terminal device, and wherein the first preset duration is determined based on quantity of slots in a subframe and the quantity of slots in the subframe is related to a system parameter of an uplink bandwidth part or an uplink frame, that is used for ACK message transmission.

21. The processing apparatus according to claim 20, wherein the first preset duration is $3N_{slot}^{subframe,\mu}$, $N_{slot}^{subframe,\mu}$ is the quantity of slots in the subframe, and $\mu$ is the system parameter.

22. The processing apparatus according to claim 21, wherein a time-domain unit in which the signal is transmitted or received by using the second beam corresponding to at least the first beam is $slot(y)+3N_{slot}^{subframe,\mu}+1$, wherein slot(y) indicates the uplink slot.

23. The processing apparatus according to claim 20, wherein the signal comprises downlink control channel information, uplink control channel information, or uplink sounding signal.

24. The processing apparatus according to claim 20, wherein the beam configuration information configures the first beam for the terminal device by indicating a transmission configuration index (TCI) by using a TCI bit, wherein the TCI bit corresponds to a TCI state, wherein the TCI state corresponds to a quasi co-location (QCL) relationship between one or more reference signals and a data channel reference signal, wherein the QCL relationship comprises frequency resource information, and wherein the frequency resource information comprises a carrier number or a bandwidth part number.

25. The processing apparatus according to claim 24, wherein when no TCI state is indicated, the first beam is a default beam.

26. The processing apparatus according to claim 20, wherein the processing apparatus is a network device.

27. A non-transitory computer-readable storage medium comprising an program which, when executed by one or more processors, cause the one or more processors to perform operations comprising:
receiving beam configuration information from a network device, wherein the beam configuration information indicates a terminal device to transmit or receive a signal by using a first beam; and
transmitting or receiving the signal by using at least the first beam after a first preset duration starting from a first time-domain unit, wherein the first time-domain unit is an uplink slot in which an acknowledgement (ACK) message for the beam configuration information is transmitted to the network device, and wherein the first preset duration is determined based on quantity of slots in a subframe and the quantity of slots in the subframe is related to a system parameter of an uplink bandwidth part or an uplink frame, that is used for ACK message transmission.

28. The non-transitory computer-readable storage medium according to claim 27, wherein the first preset duration is $3N_{slot}^{subframe,\mu}$, $N_{slot}^{subframe,\mu}$ is the quantity of slots in the subframe, and $\mu$ is the system parameter.

29. The non-transitory computer-readable storage medium according to claim 28, wherein a time-domain unit in which the signal is transmitted or received by using at at least the first beam is $slot(y)+3N_{slot}^{subframe,\mu}+1$, wherein slot(y) indicates the uplink slot.

30. The non-transitory computer-readable storage medium according to claim 27, wherein the signal comprises downlink control channel information, uplink control channel information, or uplink sounding signal.

31. The non-transitory computer-readable storage medium according to claim 27, wherein the beam configuration information configures the first beam for the terminal device by indicating a transmission configuration index (TCI) by using a TCI bit, wherein the TCI bit corresponds to a TCI state, wherein the TCI state corresponds to a quasi co-location (QCL) relationship between one or more reference signals and a data channel reference signal, wherein the QCL relationship comprises frequency resource information, and wherein the frequency resource information comprises a carrier number or a bandwidth part number.

32. The non-transitory computer-readable storage medium according to claim 31, wherein when no TCI state is indicated, the first beam is a default beam.

33. A non-transitory computer-readable storage medium comprising an program which, when executed by one or more processors, cause the one or more processors to perform operations comprising:
transmitting beam configuration information to a terminal device, wherein the beam configuration information indicates the terminal device to transmit or receive a signal by using a first beam; and
transmitting or receiving the signal by using a second beam corresponding to at least the first beam, after a first preset duration starting from a first time-domain unit, wherein the first time-domain unit is an uplink slot in which an acknowledgement (ACK) message for the beam configuration information is received from the terminal device, and wherein the first preset duration is determined based on quantity of slots in a subframe and the quantity of slots in the subframe is related to a system parameter of an uplink bandwidth part or an uplink frame, that is used for ACK message transmission.

34. The non-transitory computer-readable storage medium according to claim 33, wherein the first preset duration is $3N_{slot}^{subframe,\mu}$, $N_{slot}^{subframe,\mu}$ is the quantity of slots in the subframe, and $\mu$ is the system parameter.

35. The non-transitory computer-readable storage medium according to claim 34, wherein a time-domain unit in which the signal is transmitted or received by using the second beam corresponding to at least the first beam is $slot(y)+3N_{slot}^{subframe,\mu}+1$, wherein slot(y) indicates the uplink slot.

36. The non-transitory computer-readable storage medium according to claim 33, wherein the signal comprises downlink control channel information, uplink control channel information, or uplink sounding signal.

37. The non-transitory computer-readable storage medium according to claim 33, wherein the beam configuration information configures the first beam for the terminal device by indicating a transmission configuration index (TCI) by using a TCI bit, wherein the TCI bit corresponds to a TCI state, wherein the TCI state corresponds to a quasi co-location (QCL) relationship between one or more reference signals and a data channel reference signal, wherein the QCL relationship comprises frequency resource information, and wherein the frequency resource information comprises a carrier number or a bandwidth part number.

38. The non-transitory computer-readable storage medium according to claim 37, wherein when no TCI state is indicated, the first beam is a default beam.

* * * * *

UNITED STATES PATENT AND TRADEMARK OFFICE
CERTIFICATE OF CORRECTION

| | | |
|---|---|---|
| PATENT NO. | : 11,438,888 B2 | Page 1 of 1 |
| APPLICATION NO. | : 17/336948 | |
| DATED | : September 6, 2022 | |
| INVENTOR(S) | : Peng Guan et al. | |

It is certified that error appears in the above-identified patent and that said Letters Patent is hereby corrected as shown below:

In the Claims

In Column 38, In Line 67, In Claim 29, delete "at at" and insert -- at --.

Signed and Sealed this
Twenty-fifth Day of April, 2023

Katherine Kelly Vidal
*Director of the United States Patent and Trademark Office*